US009164716B2

(12) United States Patent
Kadota

(10) Patent No.: US 9,164,716 B2
(45) Date of Patent: Oct. 20, 2015

(54) COMMUNICATION RELAYING TECHNOLOGY AND IMAGE PROCESSING APPARATUS

(71) Applicant: Masatoshi Kadota, Takahama (JP)

(72) Inventor: Masatoshi Kadota, Takahama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/083,478

(22) Filed: Nov. 19, 2013

(65) Prior Publication Data

US 2014/0139876 A1 May 22, 2014

(30) Foreign Application Priority Data

Nov. 19, 2012 (JP) .................. 2012-253271

(51) Int. Cl.
G06F 3/12 (2006.01)
(52) U.S. Cl.
CPC ............ *G06F 3/1284* (2013.01); *G06F 3/1205* (2013.01); *G06F 3/1209* (2013.01); *G06F 3/1226* (2013.01); *G06F 3/1253* (2013.01); *G06F 3/1228* (2013.01)
(58) Field of Classification Search
None
See application file for complete search history.

(56) References Cited

U.S. PATENT DOCUMENTS

| 7,295,338 | B2 | 11/2007 | Satake et al. | |
| 8,458,292 | B2 * | 6/2013 | Polis et al. | 709/217 |
| 2002/0080391 | A1 | 6/2002 | Sugiura et al. | |
| 2003/0030843 | A1 | 2/2003 | Qiao | |
| 2003/0197890 | A1 | 10/2003 | Satake et al. | |
| 2003/0227641 | A1 * | 12/2003 | Edmonds et al. | 358/1.13 |
| 2004/0190042 | A1 | 9/2004 | Ferlitsch et al. | |
| 2004/0252333 | A1 | 12/2004 | Blume et al. | |
| 2005/0141007 | A1 | 6/2005 | Shirai et al. | |
| 2005/0248803 | A1 * | 11/2005 | Ohara | 358/1.15 |
| 2007/0268838 | A1 | 11/2007 | Moon | |
| 2008/0297833 | A1 * | 12/2008 | Hatakeyama | 358/1.15 |
| 2011/0019226 | A1 * | 1/2011 | Tsujimoto | 358/1.15 |

(Continued)

FOREIGN PATENT DOCUMENTS

| JP | 2003-316712 A | 11/2003 |
| JP | 2010-176580 A | 8/2010 |
| JP | 2011-257945 A | 12/2011 |

OTHER PUBLICATIONS

Andrew R. Mitchell, IPP USB Specification (IPP over USB), Version 1.0 Draft 20 revised May 10, 2011.

(Continued)

*Primary Examiner* — Marcus T Riley
(74) *Attorney, Agent, or Firm* — Banner & Witcoff, Ltd.

(57) ABSTRACT

A non-transitory computer-readable medium having a communication relaying program stored thereon and readable by a computer of an information processing apparatus, which is connectable to an image processing apparatus through a communication interface. The communication relaying program, when executed by the computer, causes the information processing apparatus to perform operations including: a request receiving process of receiving a processing request from a client application; an extracting process of extracting a folder name from the processing request received by the request receiving process; a specifying process of specifying a particular image processing apparatus on the basis of the folder name extracted by the extracting process; and a request transmitting process of transmitting the processing request to the specified particular image processing apparatus.

20 Claims, 19 Drawing Sheets

(56) References Cited

U.S. PATENT DOCUMENTS

| | | |
|---|---|---|
| 2011/0292424 A1 | 12/2011 | Murata |
| 2011/0302512 A1 | 12/2011 | Ishii |
| 2012/0026548 A1* | 2/2012 | Nakagawa ............... 358/1.15 |
| 2012/0133967 A1 | 5/2012 | Yasui |
| 2013/0201519 A1 | 8/2013 | Duyk et al. |
| 2014/0139877 A1* | 5/2014 | Ohara ..................... 358/1.15 |

OTHER PUBLICATIONS

Co Pending U.S. Appl. No. 14/083,481, filed Nov. 19, 2013.
Co Pending U.S. Appl. No. 14/083,497, filed Nov. 19, 2013.
Extended European Search Report issued in corresponding European Patent Application No. 13193544.7 dated Jun. 30, 2014.
Andrew R. Mitchell, "IPP USB Specification (IPP over USB)", Version 1.0 Draft 19, dated Apr. 29, 2011; Retrieved from the Internet: URL:ftp.pwg.org/pub/pwg/ipp/whitepaper/draft-ippusbspecification-20110428.pdf [retrieved on May 28, 2014]; 20 pages.
Oct. 24, 2014—(US) Non-Final Office Action—U.S. Appl. No. 14/083,481.
Apr. 8, 2015—(US) Final Office Action—U.S. Appl. No. 14/083,481.
Mar. 12, 2015—(US) Non-Final Office Action—U.S. Appl. No. 14/083,497.

* cited by examiner

FIG. 7

```
<HTML>
<HEAD>
<TITLE>PRINTER SELECTION SCREEN</TITLE>
</HEAD>
<a href="http://localhost/PRINTER3a_VID04F9_PID00A3_SER1111/main.html">PRINTER3a</a><BR>
<a href="http://localhost/PRINTER3b_VID082A_PID8B4F_SER2222/main.html">PRINTER3b</a><BR>
<a href="http://localhost/PRINTER3c_VID0A5B_PID3GBA_SER3333/main.html">PRINTER3c</a><BR>
</BODY>
</HTML>
```

FIG. 8

```
・・・OMISSION・・・

<img src="/PRINTER3a_VID04F9_PID00A3_SER1111/GIF1" />
<img src="/PRINTER3a_VID04F9_PID00A3_SER1111/GIF2" />
<img src="/PRINTER3a_VID04F9_PID00A3_SER1111/GIF3" />

・・・OMISSION・・・
```

FIG. 14

```
・・・OMISSION・・・

<img src="/%%%%/GIF1" />
<img src="/%%%%/GIF2" />
<img src="/%%%%/GIF3" />

・・・OMISSION・・・
```

COMMUNICATION RELAYING TECHNOLOGY AND IMAGE PROCESSING APPARATUS

CROSS-REFERENCE TO RELATED APPLICATIONS

This application claims priority from Japanese Patent Application No. 2012-253271 filed on Nov. 19, 2012, the entire subject matter of which is incorporated herein by reference.

TECHNICAL FIELD

Illustrative aspects of the present invention relate to a communication relaying technology.

BACKGROUND

There has been disclosed a technology for providing a web server function to an image processing apparatus and for displaying a setting screen and the like of the image processing apparatus on a web browser executed in a terminal device.

Further, there has been known a standard referred to as Internet Printing Protocol (IPP) for connecting an image processing apparatus and a terminal device by the Internet and controlling the image processing apparatus through the Internet such that the image processing apparatus processes images.

Further, there has been known a draft (Version 1.0 Draft 20 as of Nov. 19, 2012) of a standard referred to as "IPP over USB" for performing communication in accordance with the above-described IPP in an environment in which an image processing apparatus and a terminal device are connected to each other by a Universal Serial Bus (USB).

SUMMARY

In "IPP over USB", a communication relaying program is executed by the terminal device. A client application such as a web browser transmits a processing request for the image processing apparatus to the communication relaying program according to IPP. Upon receiving the processing request from the client application, the communication relaying program transmits the processing request to the image processing apparatus connected to the terminal device, according to a USB communication protocol.

In the draft of "IPP over USB", it is also described to provide an HyperText Transport Protocol (HTTP) server function to an image processing apparatus and manage the settings of the image processing apparatus according to a HTTP protocol.

By the way, a configuration in which a terminal device performs communication with a plurality of image processing apparatuses on the occasion of implementing "IPP over USB" may be considered. However, in the related art, when a processing request is transmitted from a client application to a communication relaying program, for example, a configuration to specify one of a plurality of image processing apparatuses as the transmission destination of the processing request has not been considered.

Therefore, illustrative aspects of the present invention provide a technology for specifying an image processing apparatus to be the transmission destination of the processing request transmitted from a client application in a case of relaying communication between image processing apparatuses and the client application.

According to one illustrative aspect of the present invention, there is provided a non-transitory computer-readable medium having a communication relaying program stored thereon and readable by a computer of an information processing apparatus, which is connectable to an image processing apparatus through a communication interface. The communication relaying program, when executed by the computer, causes the information processing apparatus to perform operations comprising: a request receiving process of receiving a processing request from a client application; an extracting process of extracting a folder name from the processing request received by the request receiving process; a specifying process of specifying a particular image processing apparatus on the basis of the folder name extracted by the extracting process; and a request transmitting process of transmitting the processing request to the specified particular image processing apparatus.

The technology can be implemented in a variety of forms such as a communication relaying apparatus, a communication relaying system, a communication relaying method, and a recording medium having a communication relaying program recorded thereon.

BRIEF DESCRIPTION OF THE DRAWINGS

FIG. 7 is a schematic diagram illustrating screen data of the printer selection screen;

FIG. 8 is a schematic diagram illustrating screen data of the setting screen;

FIG. 14 is a schematic diagram illustrating template screen data of the setting screen;

DETAILED DESCRIPTION

<First Exemplary Embodiment>

A first exemplary embodiment will be described with reference to FIGS. 1 to 15.

(1) Image Processing System

Figure 1:
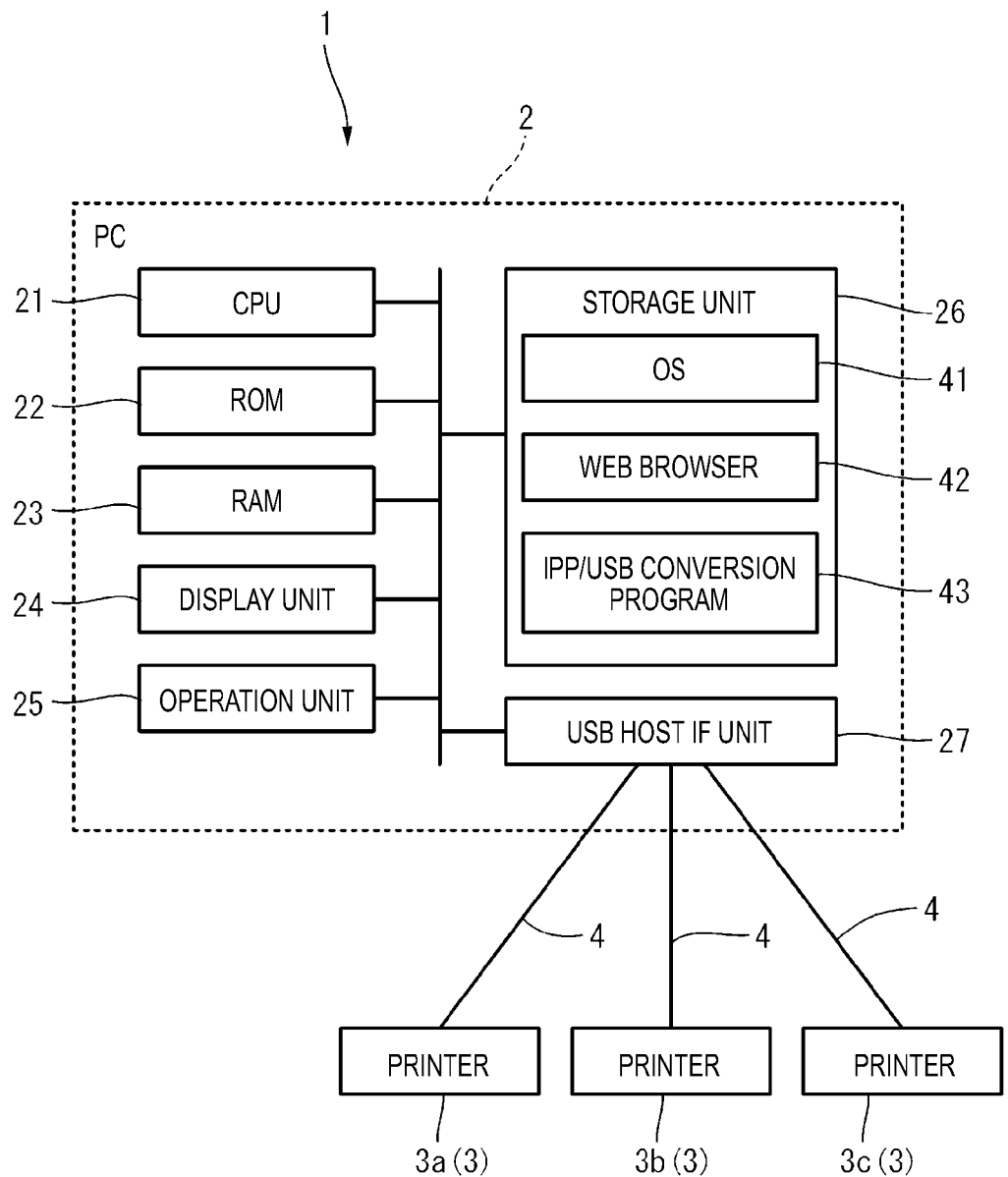
FIG. 1 is a block diagram illustrating an electrical configuration of a PC according to a first exemplary embodiment.

First, an image processing system 1 according to the first exemplary embodiment will be described with reference to FIG. 1. The image processing system 1 is configured by a personal computer (referred to as a PC) 2 and a plurality of printers 3 (3a to 3c). The PC 2 and the printers 3a to 3c are connected to each other by USB (Universal Serial Bus) cables 4 (4a to 4c) and are able to perform communication.

Each of the printers 3a to 3c is configured as a USB printer class device. In the following description, each of the printers 3a to 3c will be referred to simply as a printer 3. Incidentally, the printers 3a to 3c may be the same model or may be different models.

The PC 2 is an example of an information processing apparatus and a communication relaying apparatus. The printers 3a to 3c are examples of image processing apparatuses. USB is an example of a communication interface.

The PC 2 may perform at least the following two kinds of communication (a) and (b) with the printer 3 through the USB cable 4:

(a) for setting the printer 3
(b) for transmitting print data to the printer 3.

Such communication is performed according to the "IPP over USB" standard (Version 1.0 Draft 20 as of Nov. 19, 2012). IPP (Internet Printing Protocol) is a standard based on HTTP (HyperText Transfer Protocol) and for performing communication with the printers 3 through a Transmission Control Protocol/Internet Protocol (TCP/IP) network such as the Internet or a local area network (LAN).

"IPP over USB" is a standard for implementing communication according to the above-described IPP in an environment in which the PC and the printers are connected to each other via USB interface. In "IPP over USB", communication data of IPP is stored in USB packets which are transmitted and received. Incidentally, the present exemplary embodiment may not completely be in compliance with the "IPP over USB" standard, and may have the extended specifications thereof.

(1-1) Electrical Configuration of PC

The electrical configuration of the PC 2 will be described with reference to FIG. 1. The PC 2 includes a CPU 21, a ROM 22, a RAM 23, a display unit 24, an operation unit 25, a storage unit 26 and a USB host interface unit (referred to as "USB HOST IF UNIT" in FIG. 1) 27.

The CPU 21 controls each unit of the PC 2 by executing programs stored in the ROM 22 and the storage unit 26. The ROM 22 stores programs to be executed by the CPU 21, data, and so on. The RAM 23 is used as a main storage device which is used for the CPU 21 to perform a variety of processes. The CPU 21 is an example of a processing unit. The CPU 21 is an example of a first processing unit.

The display unit 24 is configured to include a display such as a liquid crystal display, a display driving circuit for driving the display, and so on.

The operation unit 25 is configured by a keyboard, a mouse, an interface to which the keyboard and the mouse are connected, and so on.

The storage unit 26 is a device using a non-volatile memory such as a hard disk drive and/or a flash memory to store a variety of programs and data. The storage unit 26 stores an operating system (referred to as an OS) 41, a web browser 42, and programs such as an IPP/USB conversion program 43. These programs are executed by the CPU 21.

The IPP/USB conversion program 43 is an example of a communication relaying program. The web browser 42 is an example of a client application and a specific application. The storage unit 26 is an example of a storage device.

The USB host interface unit 27 includes a USB host controller, jacks for receiving the USB cables 4, and so on. The USB host interface unit 27 is connected to the printers 3 through the USB cables 4, respectively, such that communication is possible. The USB host interface unit 27 is an example of a first communication unit.

(1-2) Printer

Figure 2:
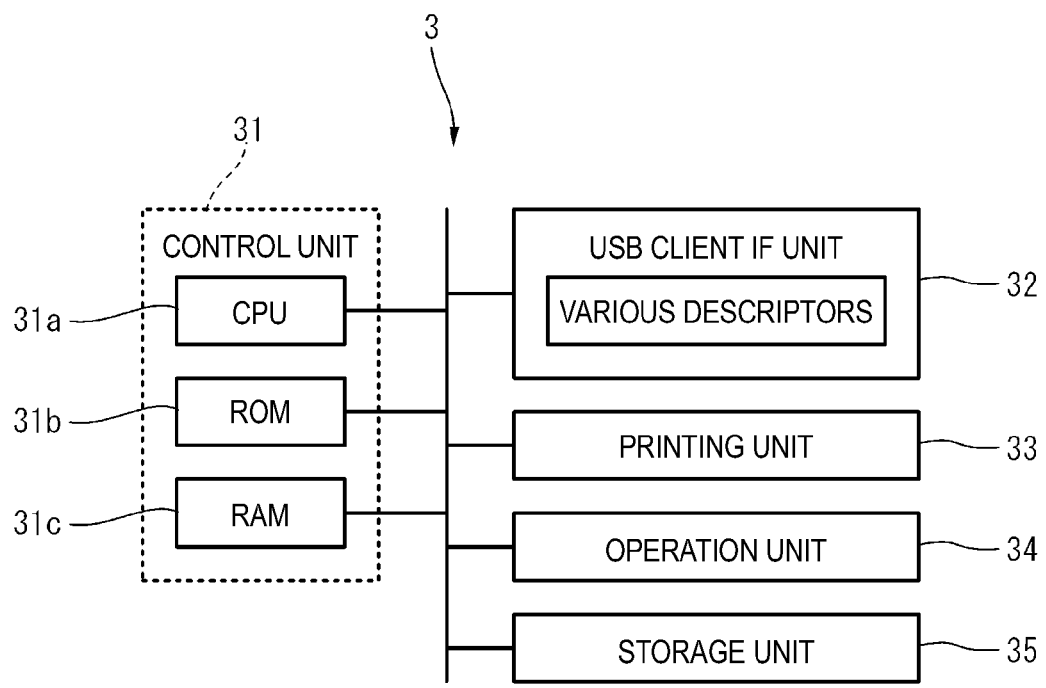
FIG. 2 is a block diagram illustrating an electrical configuration of a printer.

Subsequently, the electrical configuration of a printer 3 will be described with reference to FIG. 2. The printer 3 includes a control unit 31, a USB client interface unit (referred to as "USB CLIENT IF UNIT" in FIG. 2) 32, a printing unit 33, an operation unit 34, and a storage unit 35.

The control unit 31 includes a CPU 31a, a ROM 31a, a RAM 31c, and so on. The CPU 31a controls each unit of the printer 3 by executing control programs stored in the ROM 31a and the storage unit 35. The ROM 31b stores programs to be executed by the CPU 31a, a variety of data, and so on. The RAM 31c is used as a main storage device which is used for the CPU 31a to perform a variety of processes. The CPU 31a is an example of a second processing unit.

The printing unit 33 is configured to print an image on a sheet in accordance with an electrophotographic system, an inkjet system, or the like. The printing unit 33 includes a first tray and a second tray configured to store sheets.

The operation unit 34 includes a display such as a liquid crystal display, a variety of operation buttons, and so on.

The USB client interface unit 32 includes a jack for receiving a USB cable 4, and so on. The USB client interface unit 32 is connected to the PC 2 through the USB cable 4 such that communication is possible. The USB client interface unit 32 is an example of a second communication unit.

Further, according to the USB specifications, in the USB client interface unit 32, a variety of descriptors such as a device descriptor, a string descriptor, a vendor class descriptor, and an interface descriptor are stored. The device descriptor is information relative to the printer 3.

For example, in the device descriptor, the vendor ID, product ID, and the like of the printer 3 are described. In the interface descriptor, information for configuring an interface (which will be described later) is described. The string descriptor is a descriptor for returning character string information corresponding to an index. By designating the index, the PC 2 is able to obtain a vendor name, a model name, and a serial number from the printer 3. Since a unique serial number is assigned to each of devices of the same model, it is possible to specify the device by combining the vendor name, the model name, and the serial number. The USB client interface unit 32 is an example of a storage unit for storing unique information for identifying the image processing apparatuses.

The storage unit 35 is a device using a non-volatile memory such as a hard disk drive and/or a flash memory to store a variety of data.

(1-3) Folder Configuration of Printer

With respect to a HTTP request, the printer has a virtual folder. For example, it is assumed that the HTTP request is written in the following manner.

GET /xxxxxxxx/status.html HTTP/1.1

In this case, a web server function 52 (which will be described later) (see FIG. 4) analyzes the above-described HTTP request as a command to obtain a file "status.html" under a virtual folder "/xxxxxxxx". The printing unit 33 has the following folder as the above-described folder.

/Model Name_Vendor ID_Product ID_Serial Number

It is assumed that the above-described model name, vendor ID, product ID, and serial number are read as information described in the descriptors stored in the USB client interface unit 32, respectively. For example, it is assumed that the model name, vendor ID, product ID, and serial number of the printer 3 are "PRINTER3a", "04F9", "00A3", and "SER1111", respectively.

In this case, the folder name of the folder "/Model Name_Vendor ID_Product ID_Serial Number" becomes the following folder name. Further, here, it is assumed that with respect to the vendor ID and the product ID, character strings "VID" and "PID" are added to information described in the descriptors, respectively. However, those character strings may not be necessarily added.

PRINTER3a_VID04F9_PID00A3_SER1111

Incidentally, here, as an example of a folder name, a character string which is a sequence of a model name, a vendor ID, a product ID, and a serial number has been described. However, folder names may include information capable of identifying the plurality of printers 3 connected to the PC 2 through USB interface, from each other. For example, in a case where it is possible to identify the printers 3 from each other only by their serial numbers, the folder names may include only the serial numbers. For example, if the serial numbers are obtained from the individual printers 3, and the obtained serial numbers are different from one another, it is possible to determine that it is possible to identify the printers 3 only the serial numbers.

In the folder "/Model Name_Vendor ID_Product ID_Serial Number", there are stored data of component images to be displayed on a setting screen 60 (see FIG. 3) for setting a printing unit 33, a common gateway interface (CGI) interface, and so on.

The virtual folder is just handled to be stored in a corresponding directory by the web server function 52, and may include a file which is not located on the file system of the storage unit 35. However, hereinafter, this file will also be written like that. This process is general as a CGI function included in a web server function 52 and thus will not be described in detail.

Hereinafter, the folder "/Model Name_Vendor ID_Product ID_Serial Number" is referred to as an internal folder of the printer 3.

(2) Setting Screen of Printer

Subsequently, the setting screen 60 of the printer 3 will be described with reference to FIG. 3. The setting screen 60 is displayed by the web browser 42. It is assumed that the screen data of the setting screen 50 is described in HTML (HyperText Markup Language) or XML (Extensible Markup Language). Hereinafter, the embodiment is described under assuming that the screen data is described in HTML. As will be described in detail, the web server function 52 of the printer 3 executes a setting screen CGI, thereby generating the screen data. The web browser 42 obtains the screen data from the printer 3 according to "IPP over USB", and displays the setting screen 60. It is assumed that the file name of the screen data of the setting screen 60 is "main.html".

Figure 3:
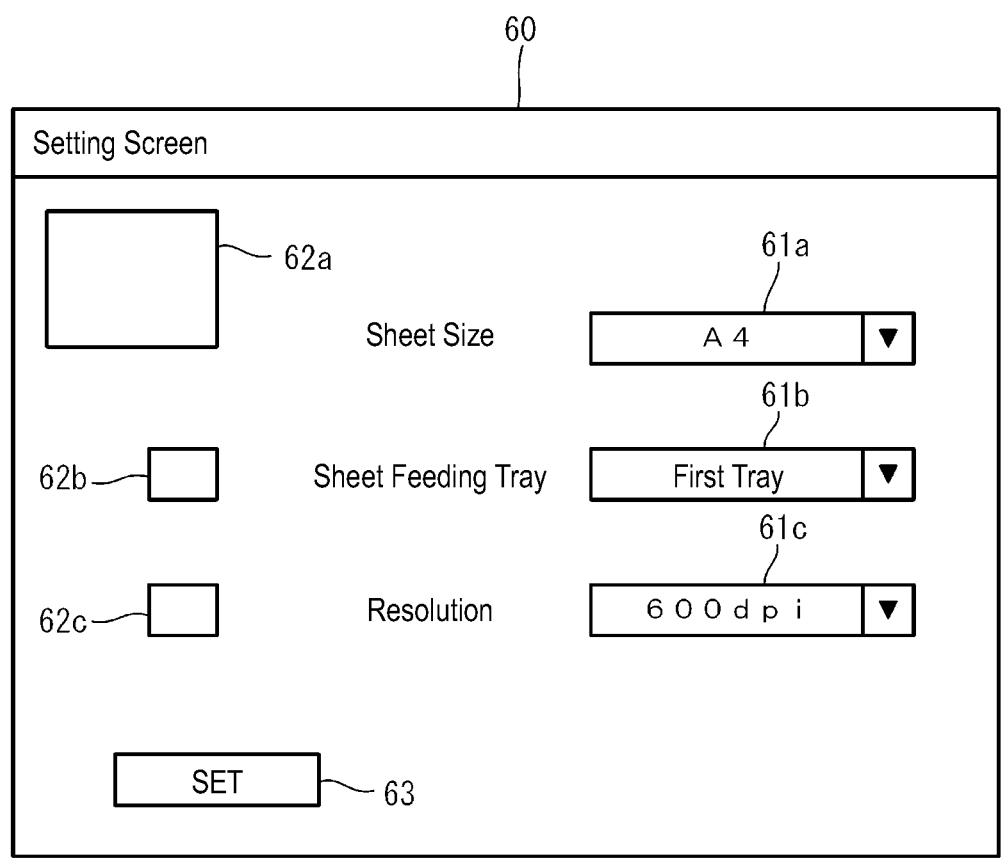
FIG. 3 is a schematic diagram illustrating a setting screen.

On the setting screen 60 shown in FIG. 3, it is available to set an item "SHEET SIZE" 61a, an item "SHEET FEEDING TRAY" 61b, and an item "RESOLUTION" 61c. Further, component images such as an image 62a, an image 62b and an image 62c, and a set button 63 are displayed on the setting screen 60. Here, the images 62a, 62b and 62c are referred to as GIF1, GIF2, and GIF3, respectively.

Incidentally, the setting screen 60 shown in FIG. 3 is an example, and the setting screen 60 may be different depending on the model of the printer 3.

(3) Program Configuration of PC and Functions of Printer

Figure 4:
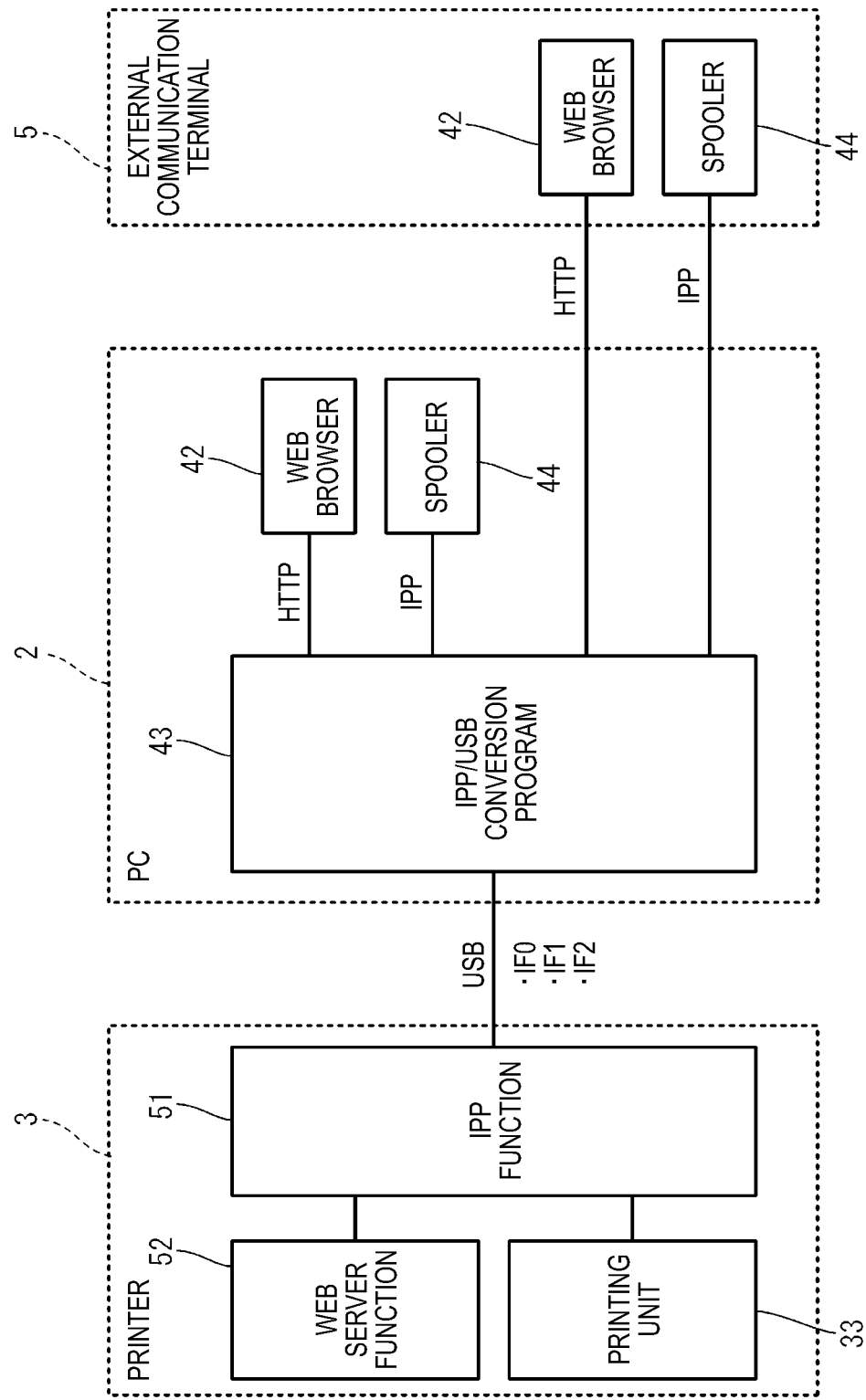
FIG. 4 is a schematic diagram illustrating a program configuration of the PC and the functions of the printer.

Subsequently, the program configuration of the PC 2 for performing communication according to "IPP over USB", and the functions of a printer 3 will be described with reference to FIG. 4.

(3-1) Program Configuration of PC

First, the program configuration of the PC 2 will be described. The PC 2 is configured to execute the IPP/USB conversion program 43, the web browser 42 and a spooler 44.

The IPP/USB conversion program 43 is for relaying the following communications (a) and (b):

(a) communication between the web browser 42 and an IPP function 51 for setting the printer 3

(b) communication between the spooler 44 and the IPP function 51 for transmitting print data to the printer 3.

The IPP/USB conversion program 43 is resident as a server program for "http://localhost:80". Here, "localhost" is the IP address of the PC 2, and may be, for example, "127.0.0.1". Further, "80" is a port number to be used. Further, the port number "80" may be omitted.

The IPP/USB conversion program 43 is configured to perform communication with the web browser 42 according to HTTP and to perform communication with the spooler 44 according to IPP.

Further, the IPP/USB conversion program 43 performs communication with the IPP function 51 through USB interface. The IPP/USB conversion program 43 will be described later in detail.

The web browser 42 is used as a user interface which is used for a user to perform setting of the printer 3. As the web browser 42, a known web browser may be used.

In an environment where the PC 2 and the printer 3 are connected to each other through USB interface, the web browser 42 transmits an HTTP request for requesting transmission of the screen data for displaying the setting screen 60 of the printer 3, an HTTP request for requesting transmission of a component image to be displayed on the setting screen 60, and the like, to the above-described host "localhost". Each of these HTTP requests is an example of a processing request. In the following description, an HTTP request is referred to simply as a processing request.

Incidentally, the processing request is not limited thereto. For example, a request for setting a set value, set on the setting screen 60 by a user, in the printer 3, such as a PUT command or a POST command, may be transmitted as a processing request. In response to that the IPP/USB conversion program 43 receives a processing request from the web browser 42, the IPP/USB conversion program 43 transmits that processing request to the IPP function 51 through USB interface.

The spooler 44 is a program for spooling print data. The spooler 44 is provided as a part of the OS 41. In the environment where the PC 2 and the printer 3 are connected to each other through USB interface, the spooler 44 performs communication with the IPP/USB conversion program 43 according to IPP to transmit print data to the IPP/USB conversion program 43.

Upon receiving the print data from the spooler 44, the IPP/USB conversion program 43 transmits the print data to the IPP function 51 of the printer 3 through USB.

Incidentally, the web browser 42 and the spooler 44 may be executed in the PC 2, or may be executed in an external communication terminal 5 connected to the PC 2.

(3-2) Functions of Printer

Subsequently, the functions of the printer 3 will be described. The printer 3 has the printing unit 33, the IPP function 51 and the web server function 52.

The control unit 31 of the printer 3 is configured to execute a control program to implement the IPP function 51. The IPP function 51 is configured to perform communication with the IPP/USB conversion program 43 through USB. Further, the IPP function 51 is configured to perform communication with the web server function 52 according to HTTP and to perform communication with the printing unit 33 according to a predetermined protocol.

Also, the web server function 52 is implemented by the control unit 31 of the printer 3 executing the control program. The web server function 52 is configured to perform a process of executing the setting screen CGI so as to generate the image data for displaying the setting screen 60 upon transmission of the image data is requested, a process of executing a printer setting CGI so as to set a set value, set on the setting screen 60, in the printer 3 upon the set value is received, and so on.

The control unit 31 operating as the web server function 52 is an example of a responding unit.

(4) Interface in USB

Subsequently, an interface in USB will be described. In USB, one or more logical communication lines referred to as "Interfaces" are configured for one physical USB cable 4.

In USB, a special endpoint referred to as Endpoint 0 for performing protocol transmission is necessarily configured. At Endpoint 0 bidirectional communication is available. Each "Interface" is configured according to the interface descriptor obtained from the printer 3 through Endpoint 0. Each "Interface" has generally one or more endpoints.

In the printer 3 of the present exemplary embodiment, it is assumed that "Interface 0" using the endpoint 0, "Interface 1" and "Interface 2" are configured. Further, each of "Interface 1" and "Interface 2" has an endpoint for reading and an endpoint for writing, respectively, and use those endpoints, thereby implementing bidirectional communication.

Further, it is assumed that "Interface 1" is used to perform the above-described communication (a) for setting the printer 3, and "Interface 2" is used to perform the communication (b) for transmitting print data to the printer 3.

Alternatively, "Interface 1" may be used to perform both of the communications (a) and (b) without configuring "Interface 2".

(5) Problem in Case where Multiple Printers are Connected to USB

Subsequently, a potential problem in a case where a plurality of printers 3 is connected to one PC 2 through USB interface will be described. Here, communication (a) for setting a printer 3 will be described as an example.

In the environment where the printers 3 and the PC 2 are connected to each other through USB interface, the user may input the following URL to the web browser 42, thereby requesting the IPP/USB conversion program 43 to transmit the screen data of the setting screen 60.

http://localhost/main.html

Upon the above URL is input, the web browser 42 transmits the following processing request A to the IPP/USB conversion program 43.

GET/main.html HTTP/1.0 . . . PROCESSING REQUEST A

In order to access to a communication partner apparatus through a network, the web browser 42 generally needs to designate an IP address to select the communication partner apparatus. However, in the configuration of the present exemplary embodiment, the IP address is just "localhost". Therefore designating the IP address "localhost" does not specify any one of the printers 3a to 3c.

Therefore, in an environment where the printers 3a to 3c are connected to the PC 2 through USB interface, even if the IPP/USB conversion program 43 receives the processing request A, it is not possible to specify one printer 3 as the transmission destination of the processing request A.

For this reason, the IPP/USB conversion program 43 uses a folder name including a character string capable of specifying a printer 3 to be the transmission destination of the processing request to specify the printer 3 as the transmission destination of a processing request. This will be described later in detail.

(6) Overall Flow of Communication Process

First, the overall flow of a communication process will be described with reference to FIG. 5. Here, the above-described communication (a) for setting a printer 3 will be described as an example. Further, here, as an object to be set, the printer 3a will be described as an example.

Upon the user inputs the above URL to the web browser 42, in STEP S101, the web browser 42 transmits the above-described processing request A to the IPP/USB conversion program 43.

However, since the processing request A does not include information indicating a printer 3 as described above, the IPP/USB conversion program 43 cannot specify one printer 3 as the transmission destination of the processing request A.

In a case where it is not possible to specify one printer 3 as the transmission destination of the processing request A, in STEP S102, the IPP/USB conversion program 43 performs a printer selection screen generating process, thereby generating screen data of a printer selection screen 65 (which will be described later).

First, the screen structure of the printer selection screen 65 will be described with reference to FIG. 6. On the printer selection screen 55, the model names of the printers 3a to 3c connected to the PC 2 through USB interface are displayed as a list.

Subsequently, the screen data of the printer selection screen 65 will be described with reference to FIG. 7. The IPP/USB conversion program 43 obtains a model name, a vendor ID, a product ID, and a serial number from each of the printers 3a to 3c. Subsequently, on the basis of those information items, the IPP/USB conversion program 43 generates the folder names of the above-described internal folders of the printer.

Next, the IPP/USB conversion program 43 generates URLs of the printers 3a to 3c using the generated folder names, and adds the generated URLs to the screen data of the setting screen 60. For example, in a case where the model name, vendor ID, product ID, and serial number of the printer 3a are "PRINTER3a", "04F9" (a hexadecimal number), "00A3" (a hexadecimal number), and "SER1111" (a string), the following link may be added.

<a href="http://localhost/PRINTER3a_VID04F9_PID00A3_SER1111/main.html">PRIN TER3a</a>

Here, each model name is an example of the identification information of an image processing apparatus. The screen data of the printer selection screen 65 is an example of the screen data which is for displaying a screen for receiving selection of the identification information of an image processing apparatus connected to the information processing apparatus, and is set such that upon identification information is selected on the corresponding screen, a processing request in which a folder name capable of an image processing apparatus identified by the selected identification information has been set is transmitted to the information processing apparatus.

Incidentally, in a case where the plurality of printers 3 connected to the PC 2 are the same model, it is not possible to identify each printer only by the model names. In this case, as identification information, for example, information "Model Name_Serial Number" obtained by adding a serial number to a corresponding model name may be displayed, or information "Model Name_USB Port Number" obtained by adding a USB port number to a corresponding model name may be displayed. Alternatively, like "Model Name (1)" and "Model Name (2)", it is possible to identify the printers by numbers. The identification information can be appropriately determined if it is possible to identify each printer 3.

The identification information is not limited to the model names. For example, the identification information may be images showing the printers 3. Alternatively, the identification information of each printer 3 may be a combination of an image and a printer name given to the corresponding printer 3.

Referring to FIG. 5 again, upon the screen data of the printer selection screen 65 is generated, in STEP S103, the IPP/USB conversion program 43 transmits the generated screen data to the web browser 42.

Upon the web browser 42 receives a model name, clicked on the printer selection screen 65 by the user, in STEP S104, in STEP S105, the web browser 42 transmits a processing request B according to a link set for the corresponding model name, to the IPP/USB conversion program 43. For example, upon the user clicks the printer 3a on the printer selection screen 65, the following processing request B is transmitted to the IPP/USB conversion program 43.

GET /PRINTER3a_VID04F9_PID00A3_SER1111/main.html HTTP/1.0 . . . PROCESSING REQUEST B Upon receiving the processing request B, the IPP/USB conversion program 43 extracts the folder name "PRINTER3a_VID04F9_PID00A3_SER1111" from the processing request B. Then, on the extracted folder name, the IPP/USB conversion program 43 specifies a printer 3 to be the transmission destination of the processing request B. Subsequently, in STEP S106, the IPP/USB conversion program 43 transmits the processing request B to the specified printer 3 (here, the printer 3a).

Upon the processing request B is received, in STEP S107, the printer 3a performs a setting screen generating process, thereby generating the screen data of the setting screen 60 (which will be described later).

The screen data of the setting screen 60 will be described with reference to FIG. 8. In the screen data of the setting screen 60, the paths of the above-described component images 62a to 62c are described. For the path of each component image, an internal folder name of the printer 3 is set. For example, in a case of the GIF1, the following path is described.

/PRINTER3a_VID04F9_PID00A3_SER1111/GIF1

The screen data of the setting screen 60 is an example of screen data which is set as the second processing request (such as a processing request C which will be described later, or a processing request which is transmitted upon the set button 63 is clicked) different from the first processing request (the above-described processing request B) such that the second processing request in which a folder name capable of specifying an image processing apparatus has been set is transmitted to the information processing apparatus.

Referring to FIG. 5 again, upon the above-described screen data of the setting screen 60 is generated, in STEP S108, the printer 3a transmits the generated screen data to the IPP/USB conversion program 43.

Upon the screen data is received from the printer 3a, in STEP S109, the IPP/USB conversion program 43 transmits the received screen data to the web browser 42.

Then, the web browser 42 analyzes the received screen data of the setting screen 60 in STEP S110, and transmits a processing request C for requesting transmission of a component image to the IPP/USB conversion program 43 in STEP S111. For example, in a case of requesting transmission of the GIF1, the following processing request C is transmitted to the IPP/USB conversion program 43.

GET /PRINTER3a_VID04F9_PID00A3_SER1111/GIF1 HTTP/1.0 . . . PROCESSING REQUEST C

Upon receiving the processing request C, the IPP/USB conversion program 43 extracts the folder name from the processing request C, and specifies the printer 3a as the transmission destination of the processing request C on the basis of the extracted folder name. Next, in STEP S112, the IPP/USB conversion program 43 transmits the processing request C to the specified printer 3a.

Upon the printer 3a receives the processing request C, in STEP S113, the printer 3a transmits the component image requested by the processing request C, to the IPP/USB conversion program 43.

Upon receiving the component image from the printer 3a, in STEP S114, the IPP/USB conversion program 43 transmits the received component image to the web browser 42.

This series of processes is repeated with respect to the GIF1 to GIF3, whereby the GIF1 to the GIF3 are read to the web browser 42 and are displayed on the setting screen 50.

Operation on the setting screen 60 is converted into a processing request such as a GET command, a PUT command, a POST command, or the like of HTTP, and is similarly transmitted to the printer 3a through the IPP/USB conversion program 43. In this way, it is possible to perform setting of the printer 3a through USB in the same procedure as that for performing setting of a printer through a TCP/IP network according to the related art.

(7) Details of Communication Relaying Process by IPP/USB Conversion Program

Subsequently, a communication relaying process of the IPP/USB conversion program 43 will be described in detail.

(7-1) Communication Relaying Process

Figure 9:
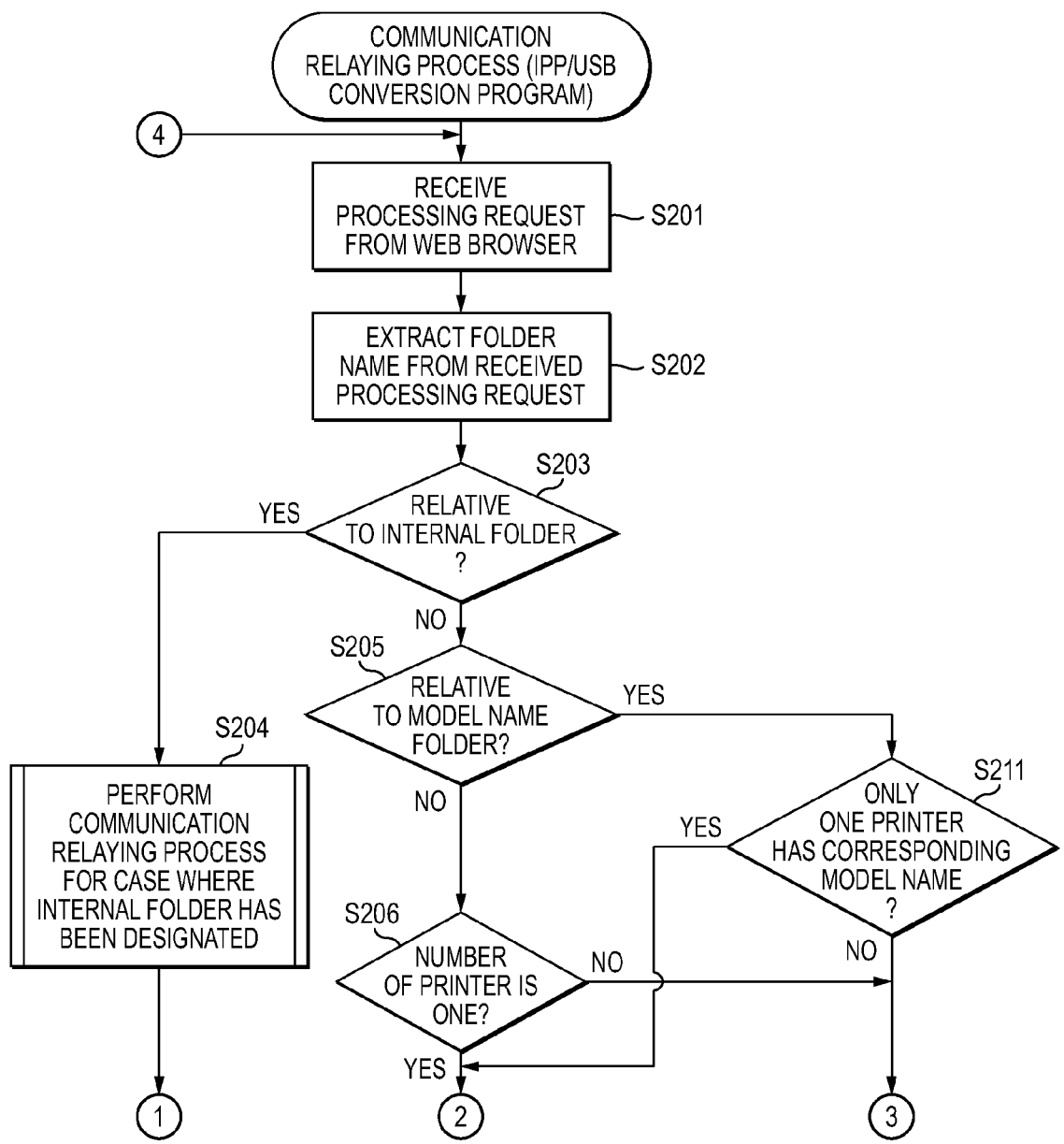
FIG. 9 is a flow chart illustrating a part of a communication relaying process.
Figure 10:
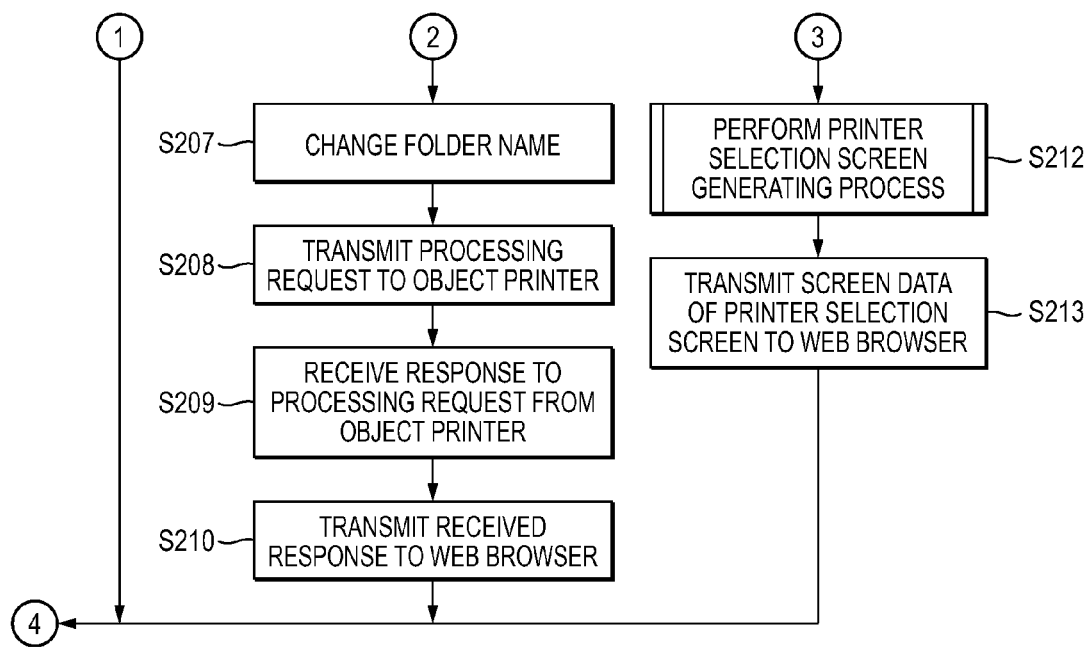
FIG. 10 is a flow chart illustrating the communication relaying process continued from FIG. 9.

First, the communication relaying process of the IPP/USB conversion program 43 will be described with reference to FIG. 9. As described above, the IPP/USB conversion program 43 is executed as a resident program, and the present process starts upon the PC 2 is powered on.

In STEP S201, the IPP/USB conversion program 43 waits for a processing request to be received from the web browser 42, and receives a processing request. Then, the IPP/USB conversion program 43 proceeds to STEP S202. STEP S201 is an example of a request receiving process.

In STEP S202, the IPP/USB conversion program 43 extracts a folder name from the processing request received in STEP S201. STEP S202 is an example of an extracting process.

In STEP S203, the IPP/USB conversion program 43 determines whether the processing request received in STEP S201 is a request relative to an internal folder of the printer. Specifically, the IPP/USB conversion program 43 determines whether the format of the folder name extracted in STEP S202 matches with a format "/Model Name_Vendor_ID_Product_ID_Serial Number". In a case where the format of the extracted folder name matches with the format "/Model Name_Vendor ID_Product ID_Serial Number", the IPP/USB conversion program 43 proceeds to STEP S204; otherwise, the IPP/USB conversion program 43 proceeds to STEP S205.

The above-described STEP S203 is an example of a specification determining process of determining whether it is possible to specify an image processing apparatus by a specifying process. Here, the specifying process of specifying a printer 3 to be the transmission destination of the processing request is performed in STEP S303 shown in FIG. 11. However, in a case where the format of the folder name does not match with the format "/Model Name_Vendor ID_Product ID_Serial Number", it is not possible to specify an image processing apparatus. Therefore, in the case where the format of the folder name does not match with the format "/Model Name_Vendor ID_Product ID_Serial Number", before the specifying process is performed in STEP S303 shown in FIG. 11, the IPP/USB conversion program 43 determines that it is not possible to specify an image processing apparatus by the specifying process.

In STEP S204, the IPP/USB conversion program 43 performs a communication relaying process for a case where an internal folder has been designated. This process is a process of specifying a printer 3 to be the transmission destination of the processing request on the basis of the folder name, and transmitting the processing request to the specified printer 3. STEP S204 will be described later in detail.

In STEP S205, the IPP/USB conversion program 43 determines whether the processing request received in STEP S201 is a request relative to a model name folder. Specifically, the IPP/USB conversion program 43 determines whether the format of the folder name extracted in STEP S202 matches with the format "Model Name". In a case where the format of the extracted folder name matches with the format "Model Name", the IPP/USB conversion program 43 proceeds to STEP S211; otherwise, the IPP/USB conversion program 43 determines that the received processing request is not a request relative to a model name folder, and proceeds to STEP S206.

In STEP S206, the IPP/USB conversion program 43 determines whether the number of printers 3 connected to the PC 2 through USB interface is one, or two or more. In a case where only one printer 3 is connected to the PC 2, the IPP/USB conversion program 43 determines that the corresponding printer 3 is a printer 3 (an object printer 3) which is the transmission destination of the processing request, and proceeds to STEP S207. On the other hand, in a case where a plurality of printers 3 is connected to the PC 2, the IPP/USB conversion program 43 proceeds to STEP S212. STEP S206 is an example of a process of determining the number of image processing apparatuses connected to the information processing apparatus.

In STEP S207, the IPP/USB conversion program 43 edits the folder name of the processing request obtained in STEP S201, thereby changing the folder name into the format "/Model Name_Vendor ID_Product ID_Serial Number". Theses model name, vendor ID, product ID, and serial number are relative to the object printer 3 determined in STEP S206 or STEP S211 (which will be described later).

In STEP S208, the IPP/USB conversion program 43 transmits the processing request having the folder name changed in STEP S207, to the object printer 3.

In STEP S209, the IPP/USB conversion program 43 receives a response to the processing request transmitted in STEP S208, from the object printer 3. STEP S209 is an example of a response receiving process.

In STEP S210, the IPP/USB conversion program 43 transmits the response received from the object printer 3, to the web browser 42. STEP S210 is an example of a response transmitting process.

In a case where it is determined in the above-described STEP S205 that the folder name does not have the format "Model Name", STEP S211 is performed.

In STEP S211, the IPP/USB conversion program 43 searches for printers 3 connected to the PC 2 through USB interface and determines whether only one of the searched printers 3 has the corresponding model name. In a case where only one of the searched printers 3 has the corresponding model name, the IPP/USB conversion program 43 determines the corresponding printer 3 as the object printer 3, and proceeds to STEP S207. On the other hand, in a case where two or more searched printers have the corresponding model name, the IPP/USB conversion program 43 proceeds to STEP S212.

In STEP S212, the IPP/USB conversion program 43 performs the printer selection screen generating process. The printer selection screen generating process is a process of generating the screen data of the above-described printer selection screen 65. The printer selection screen generating process will be described later in detail.

In STEP S213, the IPP/USB conversion program 43 transmits the screen data of the printer selection screen 65 generated in STEP S212, to the web browser 42. STEP S213 is an example of a screen data transmitting process.

(7-2) Communication Relaying Process for Case where Internal Folder has been Designated Subsequently, the communication relaying process which is performed in STEP S204 for a case where an internal folder has been designated will be described with reference to FIG. 11.

In STEP S301, the IPP/USB conversion program 43 separates the model name, the vendor ID, the product ID, and the serial number from the folder name extracted in STEP S202.

In STEP S302, the IPP/USB conversion program 43 searches for the printers 3a to 3c connected through USB interface, and obtains a model name, a vendor ID, a product ID, and a serial number from each of the printers 3a to 3c. These information items may be obtained by reading the above-described USB descriptors. A model name, a vendor ID, a product ID, and a serial number are examples of unique information. STEP S302 is an example of a first obtaining process.

In STEP S303, the IPP/USB conversion program 43 compares the model name, the vendor ID, the product ID, and the serial number separated in STEP S301 with the model name, the vendor ID, the product ID, and the serial number obtained from each printer 3 in STEP S302, and specifies a printer 3 whose model name, vendor ID, product ID, and serial number match with the model name, the vendor ID, the product ID, and the serial number separated in STEP S301, as the transmission destination of the processing request. STEP S303 is an example of a specifying process.

Incidentally, there may be no printer 3 whose model name, vendor ID, product ID, and serial number match with the model name, the vendor ID, the product ID, and the serial number separated in STEP S301. In this case, the IPP/USB conversion program 43 stops the present process, and proceeds to STEP S212.

In STEP S304, the IPP/USB conversion program 43 transmits the processing request received from the web browser 42 in STEP S201, to the printer 3 specified in STEP S303. STEP S304 is an example of a request transmitting process.

In STEP S305, the IPP/USB conversion program 43 receives a response from the printer 3. STEP S305 is an example of a response receiving process.

In STEP S306, the IPP/USB conversion program 43 transmits the response received from the printer 3, to the web browser 42. STEP S306 is an example of a response transmitting process.

The processes of STEPS S304 to S306 are the same as the processes of STEPS S208 to S210.

(7-3) Printer Selection Screen Generating Process

Subsequently, the printer selection screen generating process which is performed in STEP S212 will be described with reference to FIG. 12.

In STEP S401, the IPP/USB conversion program 43 reads template screen data of the printer selection screen 65 including a description representing a model name, and so on. It is assumed that the template screen data is stored, for example, in the storage unit 35.

In STEP S402, the IPP/USB conversion program 43 searches for printers 3 connected to the PC 2 through USB interface.

In STEP S403, the IPP/USB conversion program 43 selects one of the printers 3 searched in STEP S402.

In STEP S404, the IPP/USB conversion program 43 obtains a model name, a vendor ID, a product ID, and a serial number from the printer 3 selected in STEP S403. STEP S404 is an example of a second obtaining process. Those information items are obtained by reading the above-described USB descriptors.

In STEP S405, the IPP/USB conversion program 43 generates the folder name of an internal folder on the basis of the model name, the vendor ID, the product ID, and the serial number obtained in STEP S404. STEP S405 is an example of a generating process.

In STEP S406, the IPP/USB conversion program 43 generates a URL for the printer 3 selected in STEP S403, on the basis of the folder name generated in STEP S405.

In STEP S407, the IPP/USB conversion program 43 adds the URL generated in STEP S406, as a link to the template screen data read in STEP S401.

In STEP S408, the IPP/USB conversion program 43 determines whether all of the printers 3 searched in STEP S402 have been selected. In a case where all printers 3 has been selected, the IPP/USB conversion program 43 finishes the present process, and returns to the communication relaying process of FIG. 9; whereas in a case where there is any unselected printer 3, the IPP/USB conversion program 43 returns to STEP S403 and repeats the processes.

The template screen data to which a link has been added by the above-described processes becomes the screen data of the printer selection screen 65. The above-described printer selection screen generating process is an example of a screen data generating process.

Figure 6:
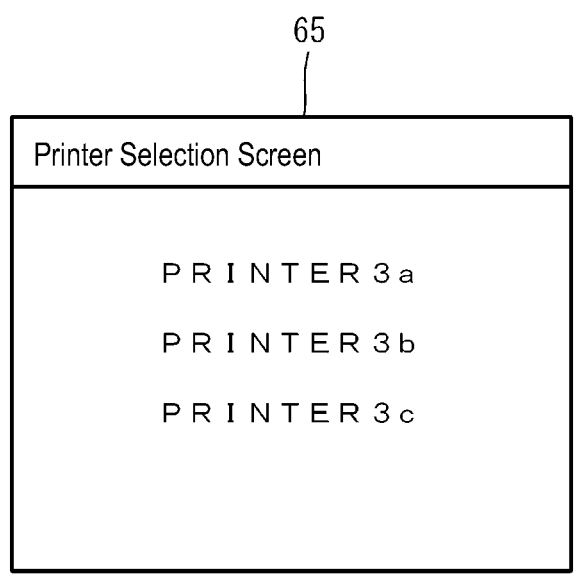
FIG. 6 is a schematic diagram illustrating the screen configuration of a printer selection screen.

The screen data of the printer selection screen 65 is generated by the printer selection screen generating process, whereby the printer selection screen 65 of FIG. 6 is displayed on the web browser 42. The printer selection screen 65 is displayed in a case where the user connects a plurality of printers 3 to the PC 2, and does not know paths for setting of the individual printers 3. The user can select a desired printer 3, and clicks the model name of the corresponding printer 3 on the printer selection screen 65 with the mouse, thereby calling the setting screen 60 of the selected printer 3. At this time, a processing request to be transmitted by the web browser 42 is written in a format "/Model Name_Vendor ID_Product ID_Serial Number", and thus the result of the determination of the above-described STEP S203 is "YES". That is, the processing request is transmitted to the printer 3 desired by the user.

(8) Processes Performed by Web Server Function

Subsequently, processes which are performed by the web server function 52 will be described.

(8-1) Process of Receiving Processing Request from IPP Function

Figure 13:
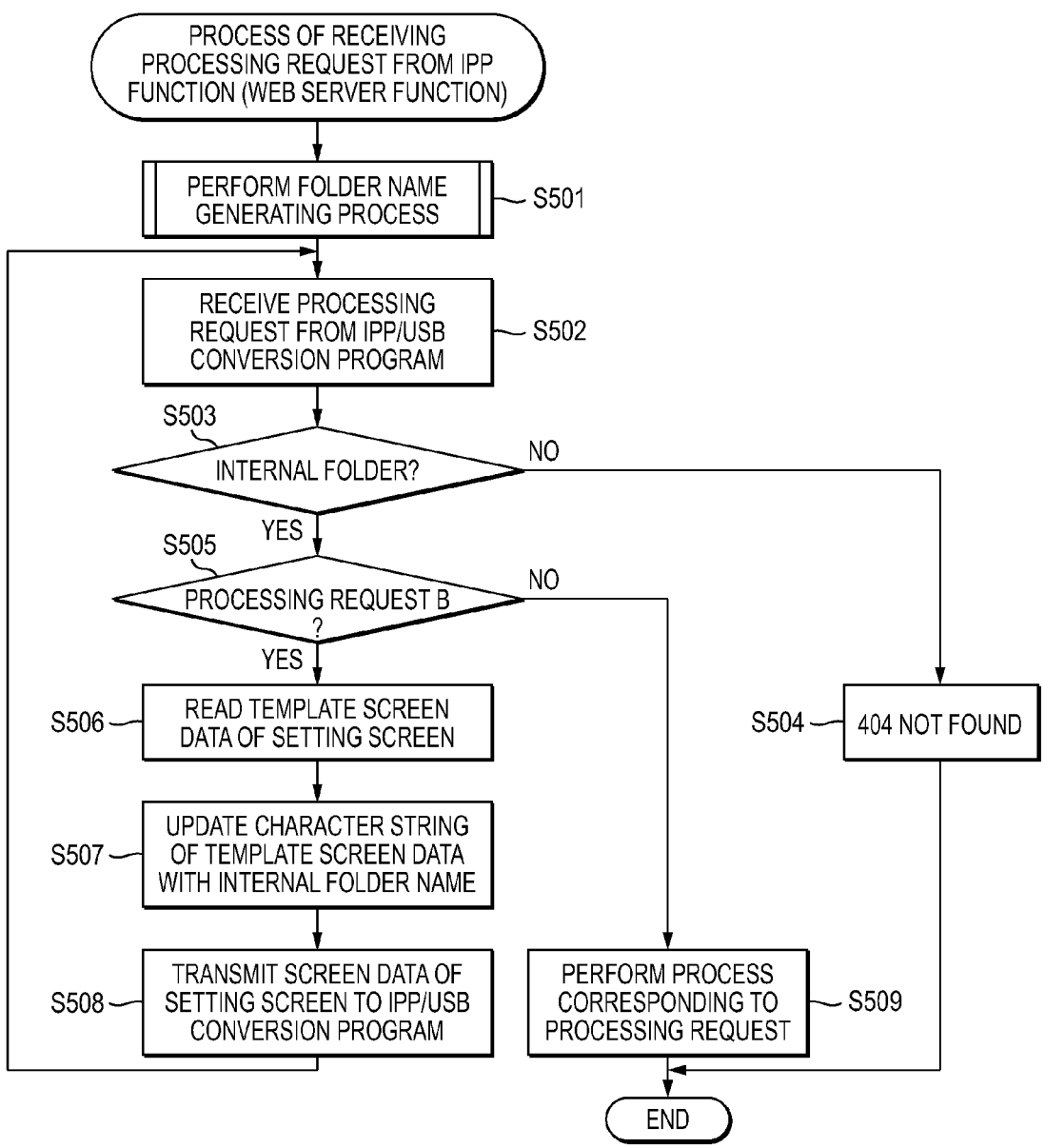
FIG. 13 is a flow chart illustrating a process of receiving a processing request from an IPP function.

First, a process of the web server function 52 receiving a processing request from the IPP function 51 will be described with reference to FIG. 13. The present process starts upon the printer 3 is powered on.

In STEP S501, the web server function 52 performs a folder name generating process. The folder name generating process is a process of generating the folder name of the above-described internal folder of the printer. The folder name generating process will be described later.

In STEP S502, the web server function 52 receives a processing request from the IPP/USB conversion program 43 through the IPP function 51.

In STEP S503, the web server function 52 extracts a folder name from the processing request received in STEP S502, and determines whether the extracted folder name matches with the folder name of the internal folder generated in STEP S501. In a case where the extracted folder name does not match with the folder name of the internal folder, the web server function 52 proceeds to STEP S504; otherwise, the web server function 52 proceed to STEP S505. STEP S503 is an example of an object determining process.

In STEP S504, the web server function 52 transmits an error message "404 NOT FOUND" to the IPP function 51. Upon receiving the error message from the web server function 52, the IPP function 51 transmits the corresponding error message to the IPP/USB conversion program 43 through USB.

In STEP S505, the web server function 52 determines whether the processing request received in STEP S502 is a processing request for requesting transmission of the screen data of the setting screen 60. Specifically, the web server function 52 determines whether the processing request received in STEP S502 is the above-described processing request B. In a case where the received processing request is the processing request B, the web server function 52 proceeds to STEP S506; otherwise, the web server function 52 proceeds to STEP S509.

In STEP S506, the web server function 52 reads the template screen data of the setting screen 60 shown in FIG. 14, from the ROM 31b. In the template screen data, a character string "%%%%%" is described in a portion indicating a folder of a path of each component image.

In STEP S507, the web server function 52 generates the screen data of the setting screen 60 by updating the character string "%%%%%" of the template screen data with the internal folder name generated in STEP S501, thereby generating the screen data of the setting screen 60.

Incidentally, it is assumed that the setting screen 60 generated here includes link information only with respect to "main.html" placed in the internal folder, and does not include any link information with respect to the previous link screen.

Further, although being not described here, as described above, on the setting screen 60, the set button 63 is also displayed. Upon the user clicks the set button 63, a processing request for setting set values set on the setting screen 60 is transmitted as a PUT command or a POST command to a printer 3. It is assumed that in STEP S507, even with respect to the PUT command or the POST command transmitted when the set button 63 was clicked, the above-described folder name is set for a path.

In STEP S508, the web server function 52 transmits the screen data generated in STEP S507, to the IPP/USB conversion program 43 through the IPP function 51.

In STEP S509, the web server function 52 performs a process corresponding to the processing request.

The above-described STEPS S508 and S509 are an example of a responding process.

(8-2) Folder Name Generating Process

Figure 15:
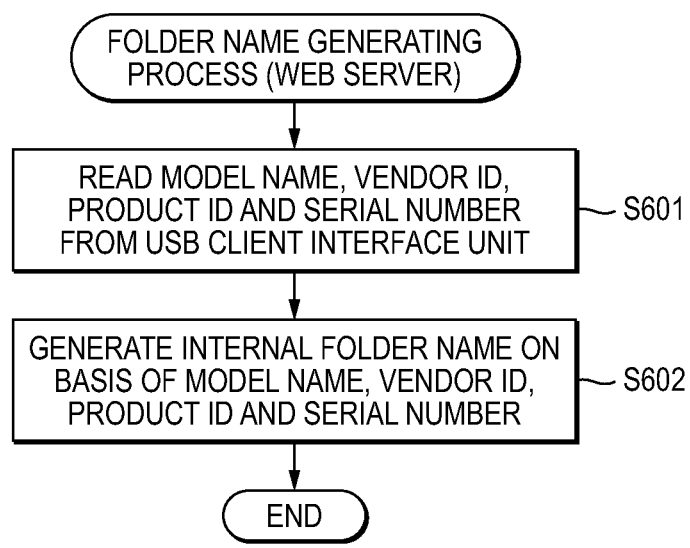
FIG. 15 is a flow chart illustrating a folder name generating process.

Subsequently, the folder name generating process which is performed in STEP S501 will be described with reference to FIG. 15.

In STEP S601, the web server function 52 reads the model name, the vendor ID, the product ID, and the serial number from the USB client interface unit 32.

In STEP S602, the web server function 52 generates an internal folder name on the basis of the model name, the vendor ID, the product ID, and the serial number read in STEP S601. In this case, the web server function 52 generates the internal folder name according to the same tool as a tool which is used for the IPP/USB conversion program 43 to generate the internal folder name in the above-described STEP S405. That is, in the first exemplary embodiment, the IPP/USB conversion program 43 and the printer 3 generate internal folder names independently, according to the common rule. Therefore, the initial folder name generated by the IPP/USB conversion program 43 may be the same as the initial folder name generated by the printer 3.

Incidentally, a part of the above-described process of receiving a processing request from the IPP function may be performed by the IPP function 51.

(9) Advantages

According to the IPP/USB conversion program 43 relative to the above-described first exemplary embodiment, in a case of relaying communication between the web browser 42 and the plurality of printers 3 through USB, a folder name is extracted from a processing request transmitted from the web browser 42, and a printer 3 is specified as the transmission destination of the processing request on the basis of the folder name. Therefore, it is possible to specify a printer 3 to be the transmission destination of the processing request.

Further, according to the IPP/USB conversion program 43, in STEP S302, the unique information of each printer 3 is obtained from the corresponding printer 3, and in STEP S303, a printer 3 whose unique information matches with the unique information included in the folder name extracted from the processing request is specified as the transmission destination of the processing request. Therefore, it is possible to surely specify a printer 3.

Further, according to the IPP/USB conversion program 43, the response to the processing request is received from the corresponding printer 3, and the received response is transmitted to the web browser 42. Therefore, the web browser 42 is able to receive the response to the processing request.

Furthermore, according to the IPP/USB conversion program 43, in a case where it is not possible to specify a printer 3 from the folder name extracted from the processing request, it is determined whether the number of printers 3 connected to the PC 2 is one, or two or more. In a case where only one printer 3 is connected to the PC 2, the processing request is transmitted to the corresponding printer 3. In the case where only one printer 3 is connected to the PC 2, even though it is not possible to specify the corresponding printer 3 to be the transmission destination of the processing request on the basis of the folder name extracted from the processing request, it is possible to determine the corresponding printer 3 as the transmission destination of the processing request. In this case, upon a processing request in which a folder name has been set is retransmitted to the web browser 42, the web browser 42 performs a useless process.

According to the IPP/USB conversion program 43, in the case where only one printer 3 is connected to the PC 2, even though it is possible to specify the corresponding printer 3 as the transmission destination of the processing request on the basis of the folder name extracted from the processing request, the processing request is transmitted to the corresponding printer 3. Therefore, it is possible to prevent the web browser 42 from performing a useless process.

Further, according to the IPP/USB conversion program 43, in the case where it is not possible to a printer 3 on the basis of the folder name extracted from the processing request, in a case where a plurality of printers 3 is connected to the PC 2, the screen data of the printer selection screen 65 is generated, and is transmitted to the web browser 42. Therefore, the user can click the model name of a printer 3 on the web browser 42, thereby transmitting the processing request in which a folder name capable of specifying the selected printer 3, to the PC 2.

Further, according to the IPP/USB conversion program 43, the unique information of each printer 3 is obtained from the corresponding printer 3, and a folder name is generated, and the generated folder name is used to generate the screen data of the printer selection screen 65. Therefore, it is possible to use the folder name to surely specifying a printer 3.

Furthermore, according to the printers 3, upon the first processing request (the processing request B) for requesting transmission of the screen data of the setting screen 60 is received from the PC 2, the screen data of the setting screen 60 set such that upon a transmission instruction is received on the corresponding setting screen 60, the second processing request (for example, the processing request C) in which the same folder name as the folder name set in the first processing request has been set is transmitted to the PC 2 is transmitted to the PC 2. Therefore, the web browser 42 which is being executed in the PC 2 is able to transmit the second processing request to a printer 3 which is the transmission destination of the first processing request.

Further, according to the printers 3, upon a printer 3 receives the first processing request from the PC 2, the corresponding printer 3 updates the second processing request in which the template screen data for the model of the corresponding printer 3 has been described, with a second processing request in which a folder name has been set, and transmits the updated template screen data as the screen data to the PC 2. Therefore, it is possible to generate the screen data on the basis of the template screen data.

Specifically, in the present exemplary embodiment, the template screen data common to the models of the printers 3 written in the ROM 31b is updated and a unique folder name of each printer 3 is inserted. Therefore, it is easy to generate an HTML file different depending on the printers 3.

<Second Exemplary Embodiment>

Figure 16:
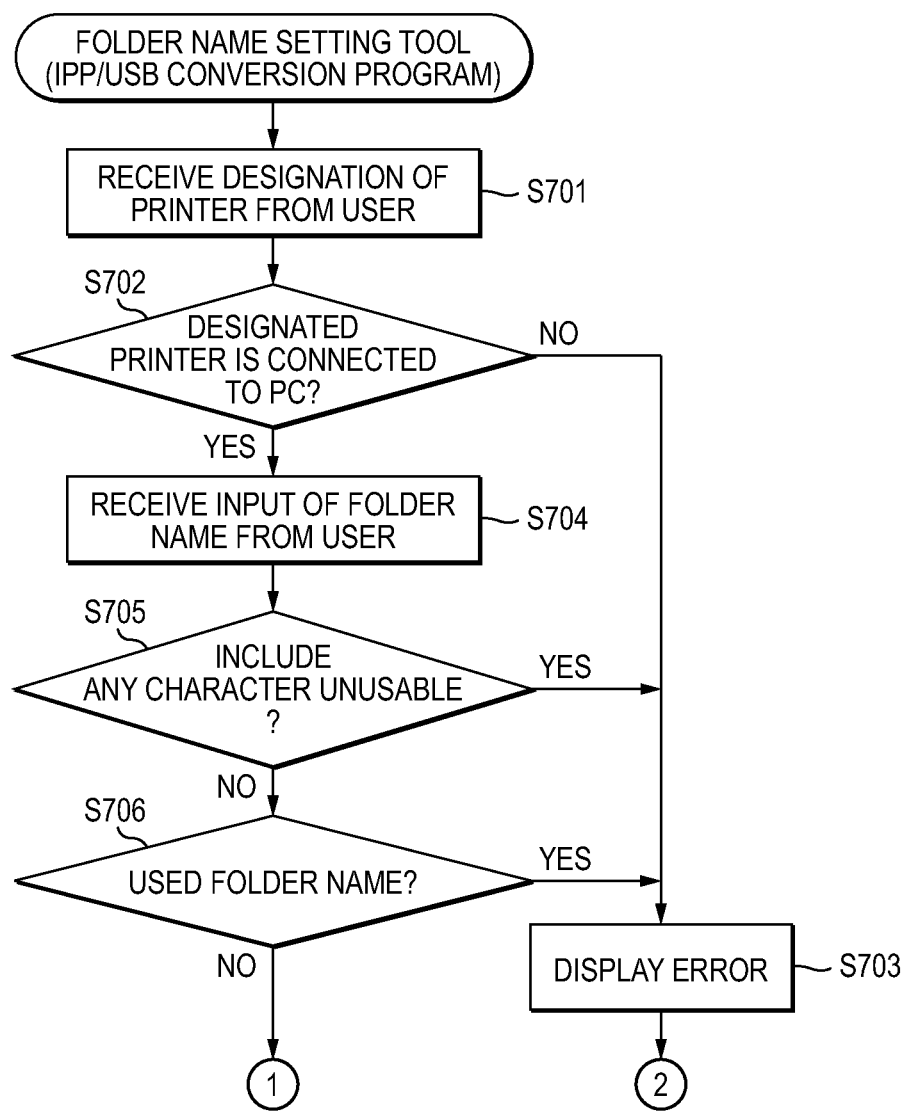
FIG. 16 is a flow chart illustrating folder name setting tool according to a second exemplary embodiment.
Figure 17:
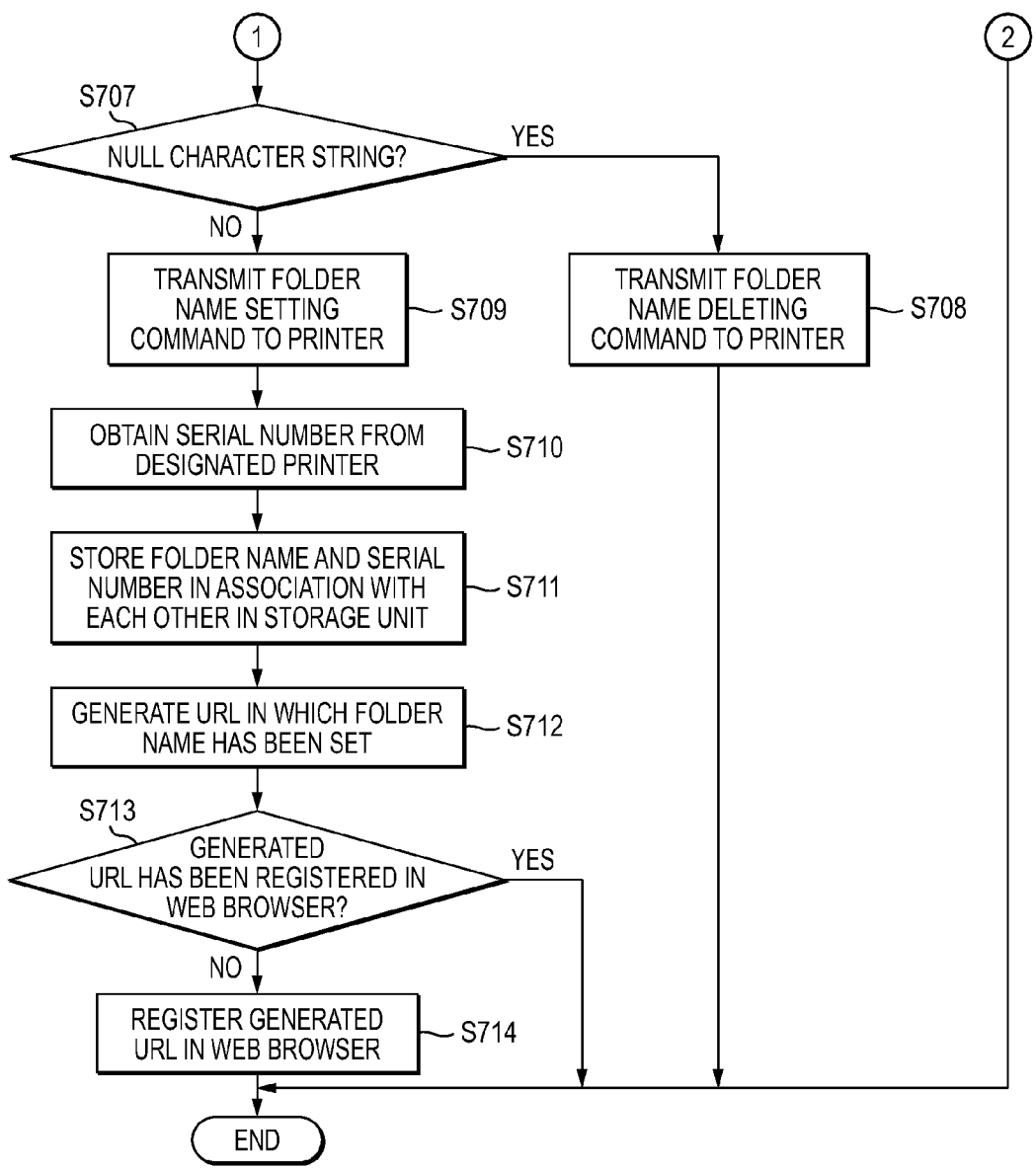
FIG. 17 is a flow chart illustrating the folder name setting tool continued from FIG. 16.

Subsequently, a second exemplary embodiment will be described with reference to FIGS. 16 and 17.

In the above-described first exemplary embodiment, the case where the IPP/USB conversion program 43 and the printers 3 generate folder names, independently from each other, according to the same tool has been described. On the other hand, in the second exemplary embodiment, the user inputs a folder name according to a folder name setting program (hereinafter, referred to as a folder name setting tool) executed in the PC 2, and the IPP/USB conversion program 43 and the printers 3 use the folder name input according to the folder name setting tool. The folder name setting tool constitutes a part of the IPP/USB conversion program 43.

(1) Process of Folder Name Setting Tool

A process of the folder name setting tool will be described with reference to FIGS. 16 and 17. The present process starts upon the user activates the folder name setting tool.

In STEP S701, the folder name setting tool receives designation of a printer 3 from the user. For example, the user inputs the model name of a printer 3 to set the folder name, thereby designating the corresponding printer 3. STEP S701 is an example of a designation receiving process.

In STEP S702, the folder name setting tool determines whether the printer 3 designated in STEP S701 is connected to the PC 2. In a case where the designated printer 3 is not connected to the PC 2, the folder name setting tool proceeds to STEP S703; whereas in a case where the designated printer 3 is connected to the PC 2, the folder name setting tool proceeds to STEP S704.

In STEP S703, the folder name setting tool displays an error. Then, the folder name setting tool finishes.

In STEP S704, the folder name setting tool receives input of an arbitrary folder name from the user. STEP S704 is an example of an input receiving process.

In STEP S705, the folder name setting tool determines whether the input folder name includes any character unusable as a folder name. In a case where the input folder name does not include any character unusable as a folder name, the folder name setting tool proceeds to STEP S706; whereas in a case where the input folder name includes any character unusable as a folder name, the folder name setting tool proceeds to STEP S703. However, since only a "null character string" is used for the shake of initializing a folder name in the determination of STEP S705, the folder name setting tool proceeds to STEP S706.

In STEP S706, the folder name setting tool determines whether the input folder name is a used folder name. Specifically, the folder name setting tool stores each folder name input in STEP S704 from the user, in the storing unit 26 in STEP S711 (which will be described later). The folder name setting tool determines whether the same folder name as the folder name input in STEP S704 is in the storing unit 26. In a case where the same folder name as the input folder name is in the storing unit 26, the folder name setting tool determines that the input folder name is a used folder name. In a case where the input folder name is not a used folder name, the folder name setting tool proceeds to STEP S707; whereas in a case where the input folder name is a used folder name, the folder name setting tool proceeds to STEP S703.

In STEP S707, the folder name setting tool determines the input folder name is the null character string. Specifically, in a case where the user presses an enter key without inputting a folder name, the folder name is the null character string. In a case where the input folder name is the null character string, the folder name setting tool proceeds to STEP S708; whereas in a case where the input folder name is not the null character string, the folder name setting tool proceeds to STEP S709.

In STEP S708, the folder name setting tool transmits a folder name deleting command to the printer 3.

Upon the printer 3 receives the folder name deleting command from the PC 2, and the folder name received from the PC 2 is in the storing unit 26, the printer 3 deletes the stored folder name and returns a default folder name.

In STEP S709, the folder name setting tool transmits a folder name setting command to the printer 3. In the folder name setting command, as an argument, the folder name input in STEP S704 is set. STEP S709 is an example of a folder name transmitting process.

Upon receiving the folder name setting command from the PC 2, the printer 3 stores the folder name set as an argument, in the storing unit 26.

In STEP S710, the folder name setting tool obtains a serial number from the printer 3 designated in STEP S701 through USB. However, the folder name setting tool may obtain any other information capable of identifying the designated printer 3 from the other printers 3. The serial number is an example of identification information for specifying an image processing apparatus.

In STEP S711, the folder name setting tool stores the folder name input in STEP S704, and the serial number obtained in STEP S710, in association with each other, in the storing unit 26. STEP S711 is an example of a storing process.

In STEP S712, the folder name setting tool generates a URL which is for obtaining the screen data of the setting screen 60 and in which the folder name input in STEP S704 has been set. Specifically, for example, the following URL is generated.

http://localhost/Input Folder Name/main.html

In STEP S713, the folder name setting tool determines whether the URL generated in STEP S712 has been registered as "Favorites" in the web browser 42. In a case where the generated URL has been registered, the folder name setting tool proceeds to STEP S714; whereas in a case where the generated URL has not been registered, the folder name setting tool finishes the present process.

In STEP S714, the folder name setting tool registers the URL generated in STEP S712, as "Favorites" in the web browser 42.

In a case where the URL is registered as "Favorites" in the web browser 42, the user can select the corresponding URL, thereby transmitting a processing request in which the folder name has been set, to the IPP/USB conversion program 43. Therefore, in this case, the IPP/USB conversion program 43 does not need to generate the printer selection screen 65 and transmit the printer selection screen 65 to the web browser 42.

Upon the printer 3 receives the folder name setting command, the printer 3 sets the designated folder name as the internal folder name according to the folder name setting command. The corresponding folder name is stored in a non-volatile memory, and thus is not deleted even if power is cut off.

The internal folder name set by the folder name setting command takes place of the folder name "Model Name_Vendor ID_Product_ID_Serial Number" of the first exemplary embodiment. That is, instead of the folder name generated in STEP S501 of FIG. 13, the folder name designated by the folder name setting command is used. Therefore, in a case where the corresponding folder name is on a path designated as a processing object of a GET command, a PUT command, or a POST command, the web server function 52 responds to the corresponding command.

Figure 11:
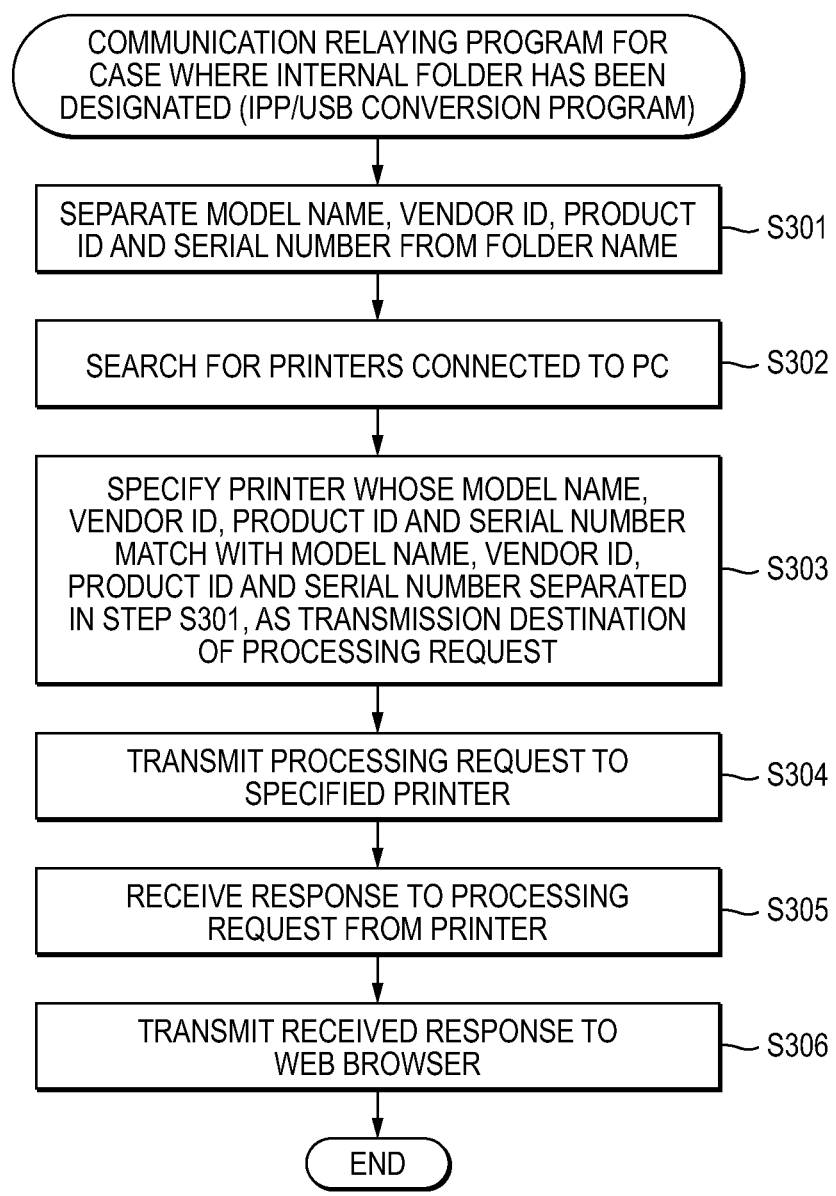
FIG. 11 is a flow chart illustrating the communication relaying process in a case where an internal folder is designated.

The IPP/USB conversion program 43 uses of the folder name stored in STEP S711, instead of the model name, the vendor ID, the product ID, and the serial number used in STEPS S301 to S304 of FIG. 11, to specify a printer. That is, the IPP/USB conversion program 43 specifies a corresponding printer by searching the information stored in STEP S711 for the folder name designated from the web browser 42.

(2) Advantages

According to the IPP/USB conversion program 43 relative to the above-described second exemplary embodiment, the user of the web browser 42 can selects the URL registered in STEP S714, thereby transmitting a processing request in which a folder name capable of specifying a printer 3 to be the transmission destination of the processing request has been set, to the communication relaying program.

Further, the IPP/USB conversion program 43 reads a serial number associated with the folder name extracted from the processing request (the serial number stored in STEP S711), from the storing unit 26, thereby capable of specifying a printer 3 to be the transmission destination of the processing request.

Further, according to the IPP/USB conversion program 43 relative to the second exemplary embodiment, the folder name input by the user is transmitted to the printer 3. Therefore, in a case where the printer performs a process using the folder name (for example, a case of generating the screen data of the setting screen 60), it is possible to use the folder name received from the PC 2.

Furthermore, according to the IPP/USB conversion program 43 relative to the second exemplary embodiment, the user (for example, a manager) can freely set a folder name. Therefore, it is possible to use words and phrases meaningful to the user, in other words, a name (for example, "TANAKA-PRN" from which the user can easily guess the position of the printer and so on.

<Third Exemplary Embodiment>

Figure 18:
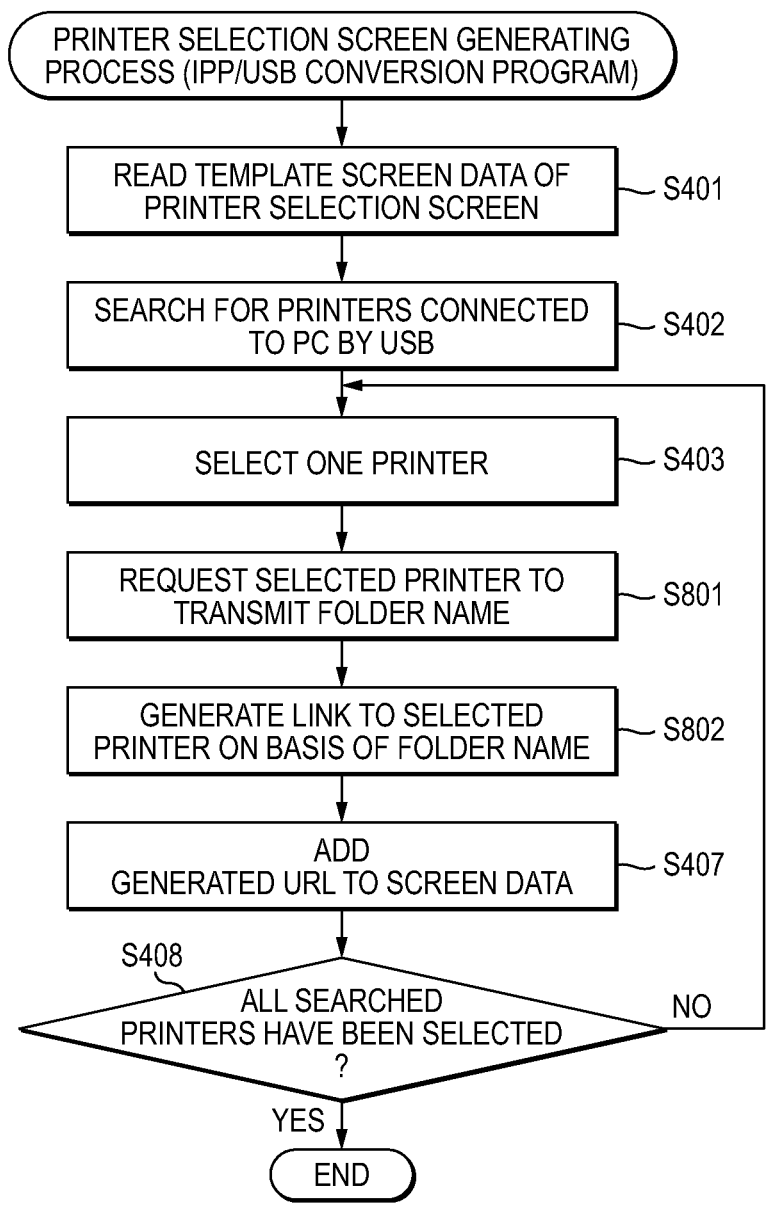
FIG. 18 is a flow chart illustrating a printer selection screen generating process according to a third exemplary embodiment.
Figure 19:
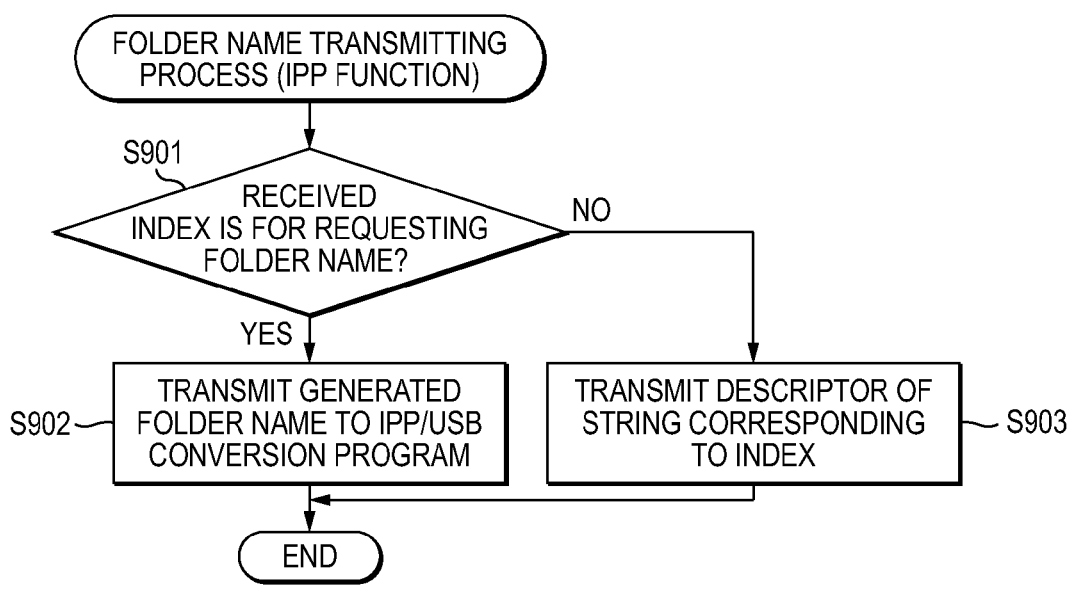
FIG. 19 is a flow chart illustrating a folder name transmitting process.

Subsequently, a third exemplary embodiment will be described with reference to FIGS. 18 and 19.

The third exemplary embodiment is a modification of the first exemplary embodiment. In the first exemplary embodiment, the example in which the IPP/USB conversion program 43 and the printers 3 generate folder names independently from each other has been described. On the other hand, in the third exemplary embodiment, each printer 3 generates a folder name, and the IPP/USB conversion program 43 obtains the folder name form each printer 3. Next, the IPP/USB conversion program 43 uses the folder names obtained from the printers 3, to perform some processes such as a process of specifying a printer 3 to be the transmission destination of a processing request and a process f generating the screen data of the setting screen 60.

(1) Printer Selection Screen Generating Process

First, a printer selection screen generating process according to the third exemplary embodiment will be described with reference to FIG. 18. Here, processes substantially identical to processes shown in FIG. 12 are denoted by the same reference symbols, and will not be described.

Figure 12:
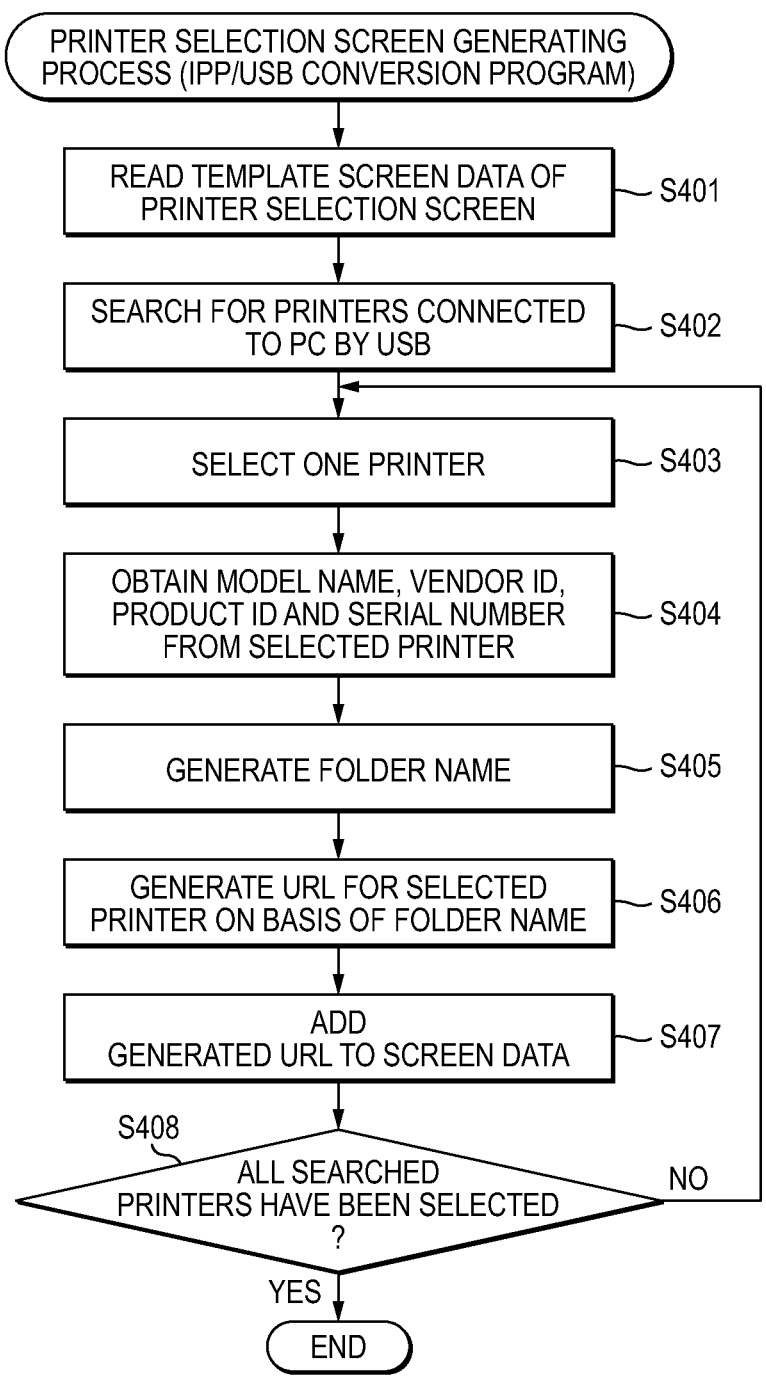
FIG. 12 is a flow chart illustrating a printer selection screen generating process.

STEPS S401 to S403 are identical to those shown in FIG. 12, and thus will not be described.

In the present exemplary embodiment, instead of the folder name generating process and the link creating process of STEPS S404 to S406 of FIG. 12, STEPS S801 and S802 are performed.

In STEP S801, the IPP/USB conversion program 43 requests the selected printer 3 to transmit the folder name. This request is transmitted to the IPP function 51 in accordance with USB protocol transmission as a USB string descriptor request. STEP S801 is an example of a requesting process.

Upon transmission of the folder name is requested, the IPP function 51 performs a folder name transmitting process (which will be described later), thereby transmitting the folder name to the IPP/USB conversion program 43.

In STEP S802, the IPP/USB conversion program 43 generates a link to the printer 3 selected in STEP S403, on the basis of the folder name received from the selected printer 3 in STEP S801.

STEPS S407 and S408 are identical to processes shown in FIG. 12, and thus will not be described.

(2) Folder Name Transmitting Process

Subsequently, the folder name transmitting process which is performed by the IPP function 51 will be described with reference to FIG. 19. The present process starts upon transmission of the folder name is requested from the IPP/USB conversion program 43 in STEP S801. A process of the IPP function 51 receiving the corresponding request from the IPP/USB conversion program 43 is an example of a folder name request receiving process.

Specifically, the IPP/USB conversion program 43 designates an index for obtaining the internal folder name in the above-described STEP S801, and requests the printer 3 to transmit a string descriptor. This request is performed in accordance with USB protocol transmission. Upon the printer 3 receives the corresponding request, the printer 3 performs the folder name transmitting process.

In STEP S900, the printer 3 determines whether the index received from the IPP/USB conversion program 43 is an index for requesting the folder name. In a case where the received index is an index for requesting the folder name, the printer 3 proceeds to STEP S902; whereas in a case where the received index is any other index (for example, the above-described serial number request), the printer 3 proceeds to STEP S903.

In STEP S902, the printer 3 transmits the folder name to the IPP/USB conversion program 43. This folder name may be generated on the basis of the model name, the vendor ID, the product ID, and the serial number described in the first engaging claws 148, or may be set by the folder name setting tool described in the second exemplary embodiment.

In STEP S903, the printer 3 transmits a corresponding string descriptor to the IPP/USB conversion program 43.

(3) Advantages

According to the IPP/USB conversion program 43 relative to the above-described third exemplary embodiment, the printer 3 is requested to transmit the folder name. Therefore, it is possible to simplify the processes of the IPP/USB conversion program 43. Further, since the naming rule of the folder name depends only on the printer 3, it is unnecessary to change the IPP/USB conversion program 43 when a printer 3 having changed the naming rule is connected.

Further, according to the printers 3, upon the PC 2 requests a printer 3 to transmit a folder name, a folder name capable of specifying the corresponding printer 3 is transmitted. Therefore, the IPP/USB conversion program 43 does not need to generate a folder name. Therefore, according to the printers 3, it is possible to simplify the processes of the IPP/USB conversion program 43.

<Modifications to Exemplary Embodiments>

The present invention is not limited to the above-described exemplary embodiments. For example, the following modifications are also included in the technical scope.

(1) In the first exemplary embodiment, the case where a model name, a vendor ID, a product ID, and a serial number are included as the unique information of each printer 3 in a folder name has been described. However, any other information capable of specifying each printer 3 may be included in a folder name. For example, the IPP/USB conversion program 43 may give an arbitrary name to each printer 3, and the user may include the given name in a folder name. Further, the IPP/USB conversion program 43 may store the given name and the unique information of the printer 3 corresponding to the given name, in association with each other, in the storing unit 26, and may read unique information corresponding to a name obtained from a folder name extracted from a processing request, from the storing unit 26, thereby specifying a printer 3 to be the transmission destination of the processing request.

Figure 5:
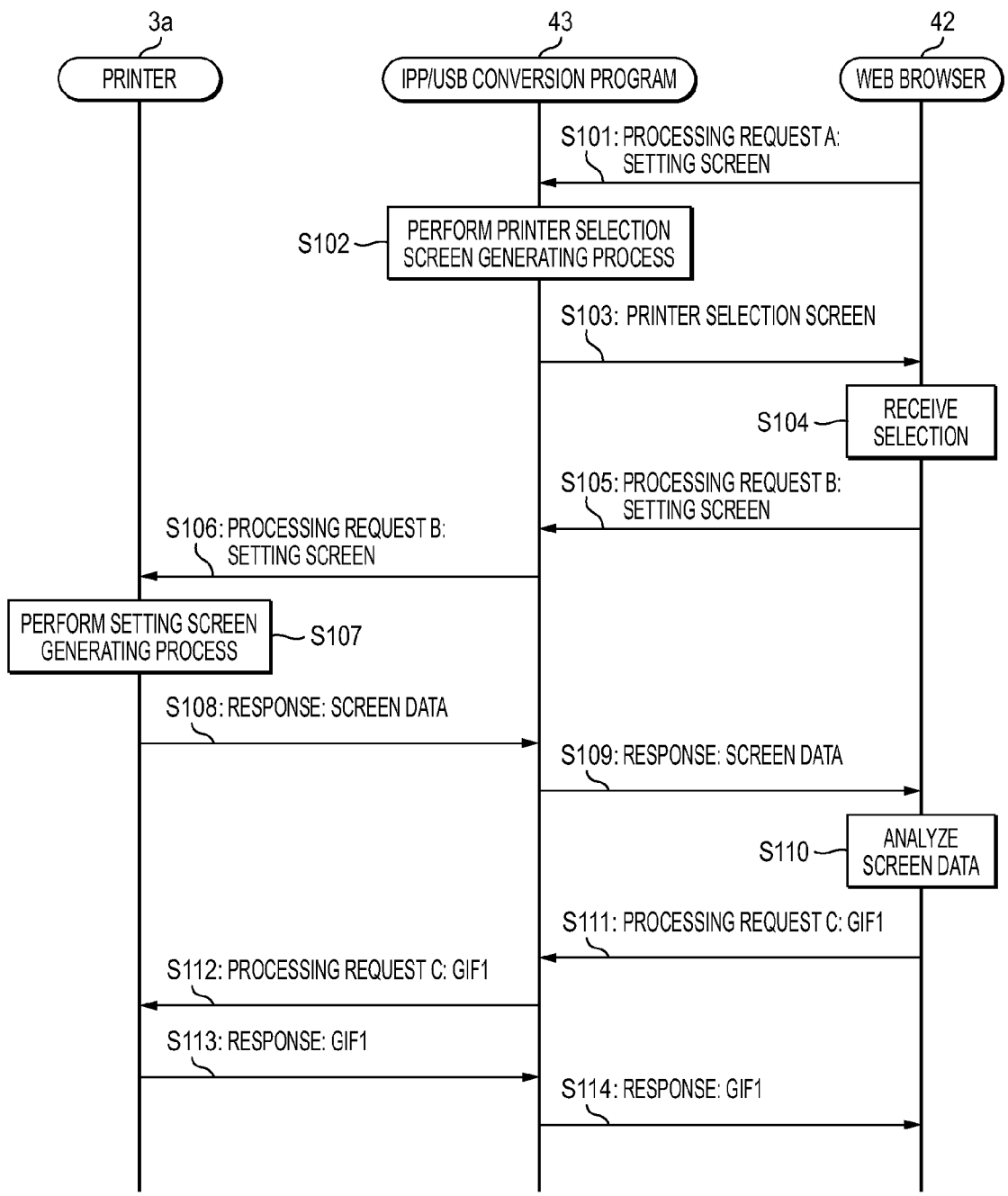
FIG. 5 is a sequence chart illustrating the overall flow of a communication process.

(2) In the above-described exemplary embodiments, a case where the IPP/USB conversion program 43 receives a response from a printer 3 and transmits the received response to the web browser 42 has been described as an example with referring to FIG. 5. On the other hand, in a case of unilaterally transmitting a processing request from the web browser 42 to a printer 3, the IPP/USB conversion program 43 may not transmit a response to the web browser 42.

(3) In the above-described first exemplary embodiment, in a case where it is determined in STEP S207 that only one printer 3 is connected to the PC 2, the IPP/USB conversion program 43 proceeds to STEP S207. On the other hand, even in the case where only one printer 3 is connected to the PC 2, the IPP/USB conversion program 43 may proceed to STEP S212 to transmit the printer selection screen 65 to the web browser 42.

(4) In the above-described exemplary embodiments, a case where a printer 3 updates the charged state "%%%%%" of the template screen data of the setting screen 60 with a folder name in STEP S508 has been described. On the other hand, each printer 3 may intactly transmit the template screen data to the IPP/USB conversion program 43, and the IPP/USB conversion program 43 may update the template screen data.

(5) In the above-described exemplary embodiments, a case where the IPP/USB conversion program 43 transmits the screen data of the printer selection screen 65 to the web browser 42 in STEP S213 has been described. However, it is necessary only for the user to be able to transmit a processing request in which a folder name capable of specifying a printer 3 has been set, from the web browser 42 to the IPP/USB conversion program 43. It is not necessarily needed to transmit the screen data of the printer selection screen 65. For example, the IPP/USB conversion program 43 may control the display unit 24 such that the display unit 24 displays the folder names of the printers 3. Then, when the user inputs a URL to the web browser 42, a folder name displayed by the IPP/USB conversion program 43 may be set in the URL.

(6) In the above-described exemplary embodiments, as an example of a communication line, USB has been described. However, the communication line is not limited to USB. For example, the PC 2 and the printers 3 may perform communication with each other according to IEEE 1284 which is a communication standard for printers.

(7) In the above-described exemplary embodiments, as an example of the image processing apparatus, the printer 3 has been described. On the other hand, the image processing apparatus may be so-called a multi-function apparatus having a printing function, a scanner function, a copying function, a facsimile function, and so on. Further, the image processing apparatus may have a single function of the image scanner or the facsimile.

(8) In the above-described exemplary embodiments, a case where the control unit 31 has one CPU 31a has been described as an example. On the other hand, the control unit 31 may be configured by one or more CPUs, or may be configured by an ASIC, or may be configured by a combination of one or more CPUs and an ASIC.

(9) In the above-described exemplary embodiments, each printer is configured so as not to request a plurality of request data items in a signal session according to a KeepAlive specification. However, even after response transmission finishes, sockets can be used without being discarded, whereby it is possible to cope with the KeepAlive specification.

(10) In the above-described exemplary embodiments, a case where the IPP/USB conversion program 43 intactly transmits a processing request received from the web browser 42, to a corresponding printer 3 has been described. On the other hand, the IPP/USB conversion program 43 may delete the folder name from the processing request received from the web browser 42, and then transmit the processing request having no folder name to the printer 3. For example, in a case where the above-described processing request B is received from the web browser 42, the IPP/USB conversion program 43 may transmit the processing request A, instead of the processing request B, to the printer 3. This is because a main reason for including a folder name in a processing request is to use the folder name for the IPP/USB conversion program 43 to specify a printer 3 to be the transmission destination of the processing request, and after a printer 3 is specified, the folder name is not necessarily needed.

(11) In the above-described exemplary embodiments, like "localhost/Model Name_Vendor ID_Product ID_Serial Number", a directory having information for specifying a model is placed in a root portion. However, in a draft of an "IPP over USB" standard (Version 1.0 Draft 20 as of Nov. 19, 2012), a directory of each function is defined to be placed in a root direction as follows.

ipp://localhost/ipp/print
ipp://localhost/ipp/scan
http://localhost/http/admin

Therefore, according to the above-described standard, the directory of each function may be placed under a function directory as follows.

http://localhost/http/admin/Model Name_Vendor ID_Product ID_Serial Number

(12) The naming rule of folder names is not limited to the above-described examples, and any other naming rule may be used. For example, in the third exemplary embodiment, the user may operate the operation unit 34 of each printer 3 to input a unique name, thereby determining a folder name. In this case, the user operates the operation unit 34 to a unique folder name for each of the printers 3a to 3c connected to the PC 2. This folder name may be read into the IPP/USB conversion program according to the technology described in the third exemplary embodiment.

What is claimed is:

1. A non-transitory computer-readable medium having a communication relaying program stored thereon and readable by a computer of an information processing apparatus, which is connectable to a plurality of image processing apparatuses through a communication interface, the communication interface being a USB interface, wherein the communication relaying program, when executed by the computer, causes the information processing apparatus to perform operations comprising:
   a request receiving process of receiving a processing request from a client application;
   an extracting process of extracting a folder name from the processing request received by the request receiving process;
   a specifying process of specifying a particular image processing apparatus from among the plurality of image processing apparatuses on the basis of the folder name extracted by the extracting process; and
   a request transmitting process of transmitting the processing request to the specified particular image processing apparatus through the USB interface.

2. The non-transitory computer-readable medium according to claim 1, wherein the communication relaying program, when executed by the computer, causes the information processing apparatus to further perform operations comprising:
- a first obtaining process of obtaining first unique information of an image processing apparatus, wherein the specifying process specifies the particular image processing apparatus by matching the first unique information obtained by the first obtaining process with second unique information included in the folder name extracted by the extracting process.

3. The non-transitory computer-readable medium according to claim 1,
wherein the communication relaying program, when executed by the computer, causes the information processing apparatus to further perform operations comprising:
- a response receiving process of receiving a response to the processing request from the specified particular image processing apparatus; and
- a response transmitting process of transmitting the received response to the client application.

4. The non-transitory computer-readable medium according to claim 1,
wherein the communication relaying program, when executed by the computer, causes the information processing apparatus to further perform operations comprising:
- a specification determining process of determining whether it is possible to specify an image processing apparatus by the specifying process; and
- a determining process of determining whether the number of image processing apparatuses connected to the information processing apparatus is one or more in a case where it is determined by the specification determining process that it is not possible to specify an image processing apparatus, and wherein, in a case where it is determined by the determining process that one image processing apparatus is connected to the information processing apparatus, the request transmitting process comprises transmitting the processing request to the one image processing apparatus.

5. The non-transitory computer-readable medium according to claim 4,
wherein the communication relaying program, when executed by the computer, causes the information processing apparatus to further perform operations comprising:
- a screen data generating process of generating screen data for displaying a screen for receiving selection of identification information of the image processing apparatus connected to the information processing apparatus, the screen data being configured to, in response to selection of the identification information, transmit a processing request with setting a folder name which enables the client application to specify the image processing apparatus identified by the selected identification information; and
- a screen data transmitting process of transmitting the screen data generated by the screen data generating process to the client application.

6. The non-transitory computer-readable medium according to claim 5,
wherein the communication relaying program, when executed by the computer, causes the information processing apparatus to further perform operations comprising:
- a second obtaining process of obtaining unique information of the image processing apparatus; and
- a generating process of generating the folder name using the unique information obtained by the second obtaining process, wherein the screen data generating process comprises generating the screen data by using the folder name generated by the generating process.

7. The non-transitory computer-readable medium according to claim 5,
wherein the communication relaying program, when executed by the computer, causes the information processing apparatus to further perform operations comprising:
- a requesting process of requesting the image processing apparatus to transmit the folder name, and wherein the screen data generating process comprises generating the screen data by using the folder name received from the image processing apparatus.

8. The non-transitory computer-readable medium according to claim 1,
wherein the communication relaying program, when executed by the computer, causes the information processing apparatus to further perform operations comprising:
- a designation receiving process of receiving a designation of the image processing apparatus;
- an input receiving process of receiving input of a folder name relative to the image processing apparatus designated by the designation receiving process; and
- a storing process of storing identification information for specifying the image processing apparatus designated by the designation receiving process, in association with the folder name received by the input receiving process in a storage device.

9. The non-transitory computer-readable medium according to claim 8,
wherein the communication relaying program, when executed by the computer, causes the information processing apparatus to further perform operations comprising:
- a folder name transmitting process of transmitting the folder name received by the input receiving process to the corresponding image processing apparatus.

10. An image processing apparatus configured to be connectable to an information processing apparatus through a communication interface, wherein a plurality of image processing apparatuses is connectable to the information processing apparatus through a respective communication interface, the respective communication interface being a USB interface, the image processing apparatus comprising:
- a communication device configured to perform communication with the information processing apparatus through the communication interface; and
- a control device configured to control the image processing apparatus to perform:
  - a folder name request receiving process of receiving a folder name transmission request, which has been transmitted from the information processing apparatus with designating the image processing apparatus as a specified image processing apparatus from among the plurality of the image processing apparatuses; and a folder name transmitting process of, upon receiving the folder name request by the folder name request receiving process, transmitting a folder name to the information processing apparatus through the USB interface, wherein the folder name causes the information processing apparatus to specify the image processing apparatus.

11. The image processing apparatus according to claim 10, wherein the control device is further configured to, upon receiving a first processing request for requesting screen data transmission from the information processing apparatus, control the image processing apparatus to transmit screen data for displaying a screen for receiving a transmission instruction of a second processing request, which is different from the first processing request, to the information processing apparatus, the screen data being configured to cause the information processing apparatus to transmit the second processing request with setting the folder name to the image processing apparatus.

12. The image processing apparatus according to claim 11, wherein upon receiving the first processing request from the information processing apparatus, the control device is configured to control the image processing apparatus to:
update a draft second processing request described in a template screen data for the corresponding image processing apparatus with the second processing request in which the folder name is set; and
transmit the updated template screen data to the information processing apparatus as the screen data.

13. The image processing apparatus according to claim 11, wherein upon receiving the first processing request from the information processing apparatus, the control device is configured to control the image processing apparatus to:
read a template screen data for the corresponding image processing apparatus from a storage device;
update the template screen data for the corresponding image processing apparatus with the second processing request by setting the folder name to the template screen data; and
transmit the updated template screen data to the information processing apparatus as the screen data.

14. An image processing apparatus configured to be connectable to an information processing apparatus through a communication interface, wherein a plurality of image processing apparatuses is connectable to the information processing apparatus through a respective communication interface, the respective communication interface being a USB interface, the image processing apparatus comprising:
a communication device configured to perform communication with the information processing apparatus through the communication interface;
a storage device storing a unique information for identifying the image processing apparatus; and
a control device configured to control the image processing apparatus to perform:
a folder name generating process of generating a folder name by using the unique information stored in the storage device;
an object determining process of, upon receiving a processing request, which has been transmitted from the information processing apparatus with designating the image processing apparatus as a specified image processing apparatus from among the plurality of the image processing apparatuses, determining whether the processing request is related to a processing object designated by the folder name generated by the folder name generating process; and
a responding process of, in a case where it is determined that the processing request is related to the processing object designated by the folder name generated by the folder name generating process, transmitting the processing object to the information processing apparatus through the USB interface.

15. The image processing apparatus according to claim 14, wherein the control device is further configured to, upon receiving a first processing request for requesting screen data transmission from the information processing apparatus, control the image processing apparatus to transmit screen data for displaying a screen for receiving a transmission instruction of a second processing request, which is different from the first processing request, to the information processing apparatus, the screen data being configured to cause the information processing apparatus to transmit the second processing request with setting the folder name to the image processing apparatus.

16. The image processing apparatus according to claim 15, wherein upon receiving the first processing request from the information processing apparatus, the control device is configured to control the image processing apparatus to:
update a draft second processing request described in a template screen data for the corresponding image processing apparatus with the second processing request in which the folder name is set; and
transmit the updated template screen data to the information processing apparatus as the screen data.

17. The image processing apparatus according to claim 15, wherein upon receiving the first processing request from the information processing apparatus, the control device is configured to control the image processing apparatus to:
read a template screen data for the corresponding image processing apparatus from the storage device;
update the template screen data for the corresponding image processing apparatus with the second processing request by setting the folder name to the template screen data; and
transmit the updated template screen data to the information processing apparatus as the screen data.

18. The non-transitory computer-readable medium according to claim 1, wherein the request transmitting process comprises transmitting the processing request to the specified particular image processing apparatus through the USB interface according to an Internet Printing Protocol over USB.

19. The image processing apparatus according to claim 10, wherein the folder name transmitting process comprises transmitting the folder name to the information processing apparatus through the USB interface according to an Internet Printing Protocol over USB.

20. The image processing apparatus according to claim 14, wherein the responding process comprises transmitting the processing object to the information processing apparatus through the USB interface according to an Internet Printing Protocol over USB.

* * * * *